(12) United States Patent
Amano

(10) Patent No.: US 8,154,614 B2
(45) Date of Patent: Apr. 10, 2012

(54) IMAGE PLAYBACK DEVICE AND METHOD AND ELECTRONIC CAMERA WITH IMAGE PLAYBACK FUNCTION

(75) Inventor: Harue Amano, Kawasaki (JP)

(73) Assignee: Nikon Corporation, Tokyo (JP)

( * ) Notice: Subject to any disclaimer, the term of this patent is extended or adjusted under 35 U.S.C. 154(b) by 774 days.

(21) Appl. No.: 12/120,099

(22) Filed: May 13, 2008

(65) Prior Publication Data

US 2008/0219646 A1 Sep. 11, 2008

Related U.S. Application Data

(60) Division of application No. 11/234,214, filed on Sep. 26, 2005, now Pat. No. 7,379,099, which is a continuation of application No. 09/965,858, filed on Oct. 1, 2001, now abandoned, which is a continuation of application No. 08/993,984, filed on Dec. 18, 1997, now abandoned.

(30) Foreign Application Priority Data

Dec. 19, 1996 (JP) .................................... 8-339338

(51) Int. Cl.
*H04N 5/228* (2006.01)
*H04N 5/222* (2006.01)
(52) U.S. Cl. .................. 348/222.1; 348/333.01
(58) Field of Classification Search .......... None
See application file for complete search history.

(56) References Cited

U.S. PATENT DOCUMENTS

| | | | |
|---|---|---|---|
| 5,235,427 A | 8/1993 | Kim | 348/208 |
| 5,371,551 A | 12/1994 | Logan et al. | 348/714 |
| 5,479,206 A * | 12/1995 | Ueno et al. | 348/211.5 |
| 5,539,455 A | 7/1996 | Makioka | 348/220 |
| 5,631,710 A | 5/1997 | Kamogawa et al. | 348/555 |
| 5,745,799 A | 4/1998 | Morofuji | 396/55 |
| 5,754,728 A | 5/1998 | Nakajima et al. | 386/68 |
| 5,809,202 A | 9/1998 | Gotoh et al. | 386/69 |
| 5,841,938 A | 11/1998 | Nitta et al. | 386/68 |
| 5,842,054 A | 11/1998 | Suzuki et al. | 348/208 |
| 5,881,202 A | 3/1999 | Herz | 386/68 |
| 5,903,705 A * | 5/1999 | Yonemitsu et al. | 386/240 |
| 5,949,481 A | 9/1999 | Sekine et al. | 348/208 |
| 6,038,364 A | 3/2000 | Koyama et al. | 386/46 |
| 6,078,726 A | 6/2000 | Gotoh et al. | |
| 6,084,633 A * | 7/2000 | Gouhara et al. | 348/231.6 |
| 6,215,949 B1 | 4/2001 | Tanaka | 386/52 |

FOREIGN PATENT DOCUMENTS

| | | |
|---|---|---|
| JP | 3-80782 | 4/1991 |
| JP | 6-165009 | 6/1994 |
| JP | 6-165107 | 6/1994 |
| JP | 7-288833 | 10/1995 |
| JP | 8-84319 | 3/1996 |
| JP | 8-116514 | 5/1996 |
| JP | 8-292796 | 11/1996 |
| JP | 8-95596 | 12/1996 |
| JP | 8-331495 | 12/1996 |

* cited by examiner

*Primary Examiner* — Luong T Nguyen
(74) *Attorney, Agent, or Firm* — Miles & Stockbridge P.C.

(57) ABSTRACT

An image playback device, which may be part of an electronic camera, reads out recorded information that has been recorded on a recording medium. A time period discriminator receives the recorded information read out by the image playback device and discriminates periods of time during which recorded information agrees with certain pre-set conditions. Moving-picture image information contained in the recorded information is played back and displayed in accordance with results of the discrimination.

6 Claims, 24 Drawing Sheets

IMAGE PLAYBACK DEVICE AND METHOD AND ELECTRONIC CAMERA WITH IMAGE PLAYBACK FUNCTION

CROSS-REFERENCE TO RELATED APPLICATIONS

This application claims the priority of Japanese Patent Application No. 08-339338 filed Dec. 19, 1996, which is incorporated herein by reference.

This application is a division of application Ser. No. 11/234,214 filed Sep. 26, 2005 now U.S. Pat. No. 7,379,099, which is a continuation of application Ser. No. 09/965,858 filed Oct. 1, 2001 (abandoned), which is a continuation of application Ser. No. 08/993,984 filed Dec. 18, 1997 (abandoned).

BACKGROUND OF THE INVENTION

1. Field of the Invention

The present invention concerns an image playback device which plays back moving-picture image information, and an electronic camera which has a moving-picture image information playback function. More specifically, the present invention concerns an image playback device and an electronic camera which can select or discard moving-picture image information according to prescribed set conditions, and which can play back and display such information only during certain limited periods.

2. Related Background Art

In the past, image playback devices and electronic cameras which play back moving-picture image information recorded on a recording medium have been adapted for practical use.

Especially in recent years, as a result of the development of digital image processing using computers, etc., devices which play back image files that have been subjected to high-efficiency encoding such as the MPEG standard, etc., have become known.

In image playback devices of this type, when instructions are given for the playback of a prescribed image file, the moving-picture image information contained in the image file is played back and displayed throughout a continuous time period.

However, unedited image files contain numerous unnecessary playback images (hereafter referred to as "unnecessary locations"). Ordinarily, the operator runs the playback images at fast forward in order to skip over such unnecessary locations.

During such fast-forward operation, the operator must confirm the end points of unnecessary locations visually, and must therefore constantly monitor fast-forward images which have poor visual recognition characteristics. As a result, fast-forward skipping of unnecessary locations is tedious and difficult.

Furthermore, it often happens that the operator will not notice the end point of an unnecessary location, and will inadvertently continue fast-forward operation into important playback locations.

SUMMARY OF THE INVENTION

Accordingly, a first object of the invention is to provide an image playback device and method which make it possible to observe playback images while automatically skipping over unnecessary playback locations by discriminating time periods with specified conditions, and performing playback based on the results of this discrimination.

A second object of the invention is to provide an image playback device and method which allow direct playback of the contents of moving-picture image information (i.e., the flow of stories or conversations, etc.).

A third object of the invention is to provide an image playback device and method which make it possible to extract and playback the conversation of specified speakers, etc.

A fourth object of the invention is to provide an image playback device and method which make it possible to omit locations of faulty imaging caused by backlighting, etc.

A fifth object of the invention is to provide an image playback device and method which make it possible to discriminate between panning scenes and scenes other than panning scenes, and to play back scenes of one or the other type.

A sixth object of the invention is to provide an image playback device and method which make it possible to perform playback with locations in which the principal object of imaging is absent (e.g., locations in which only a wall is imaged, etc.) being deliberately omitted.

A seventh object of the invention is to provide an image playback device and method which divide moving-picture image information into images from which persons are absent and images in which persons are present, and play back images of one or the other type.

An eighth object of the invention is to provide an electronic camera and operating method which allow (for example) observation with automatic skipping of specified playback locations by discriminating imaging parameters as conditions during imaging, and performing playback based on the results of this discrimination.

A ninth object of the invention is to provide an electronic camera and operating method which make it possible to perform playback with playback locations showing an out-of-focus state omitted.

A tenth object of the invention is to provide an electronic camera and operating method which make it possible to perform playback with locations imaged at a lens position at the point-blank end omitted.

An eleventh object of the invention is to provide an electronic camera and operating method which make it possible to divide moving-picture image information into scenery images, etc., and images other than scenery images, etc., and to play back images of one or the other type.

A twelfth object of the invention is to provide an electronic camera and operating method which allow (for example) observation with automatic skipping of specified playback locations by discriminating the surrounding environment as conditions during imaging, and performing playback based on the results of this discrimination.

A thirteenth object of the invention is to provide an electronic camera and operating method which make it possible to perform playback in which images of objects that have a specified surface temperature are extracted.

Briefly stated, in one of its broader aspects, the present invention comprises a medium playback means which reads out recorded information from a recording medium, a time period discriminating means which receives the recorded information read out by the image playback means and discriminates periods of time during which the recorded information agrees with at least one pre-set condition, and a playback display means which plays back and displays moving-picture image information contained in the recorded information in accordance with results of the discrimination performed by the time period discriminating means.

BRIEF DESCRIPTION OF THE DRAWINGS

The invention will be further described in conjunction with the accompanying drawings, which illustrate preferred (best mode) embodiments and illustrative implementations, and the figures of which are briefly described hereinafter.

DESCRIPTION OF PREFERRED EMBODIMENTS AND ILLUSTRATIVE IMPLEMENTATIONS

Figure 1:
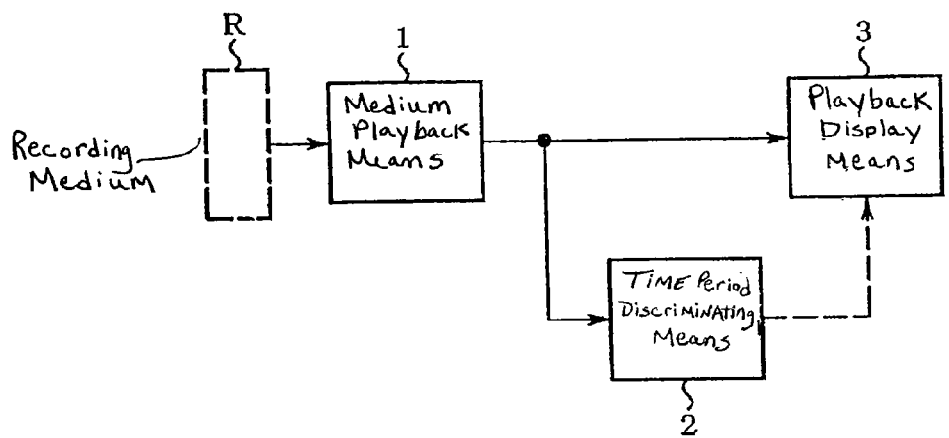
FIG. 1 is a block diagram illustrating a first (general) embodiment of the invention.

FIG. 1 is a block diagram which illustrates a first (general) embodiment of the invention.

The invention shown in FIG. 1 is characterized by the fact that an image playback device is equipped with a medium playback means 1 which reads out recorded information that has been recorded on a recording medium R, a time period discriminating means 2 which receives the recorded information read out by the image playback means 1 and discriminates periods of time during which the recorded information agrees with at least one pre-set condition, and a playback display means 3 which plays back and displays moving-picture image information contained in the recorded information in accordance with the results of the discrimination performed by the time period discriminating means 2.

Figure 2:
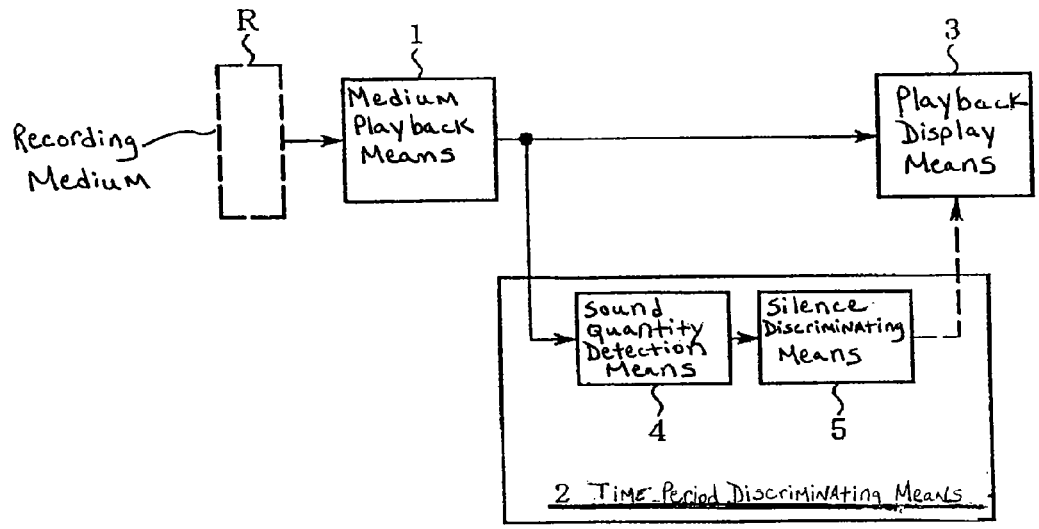
FIG. 2 is a block diagram illustrating a second embodiment.

FIG. 2 is a block diagram which illustrates a second embodiment invention.

The second embodiment is characterized by the fact that in the image playback device of the first embodiment, a time period discriminating means 2 is equipped with a sound quantity detection means 4 which receives audio information from the recorded information read out by the medium playback means 1, and detects the quantity of sound of this audio information, and a silence discriminating means 5 which discriminates silent periods in which the quantity of sound detected by the sound quantity detection means 4 drops below a predetermined sound quantity, and by the fact that the playback display means 3 plays back and displays moving-picture image information contained in the recorded information only during time periods other than the silent periods discriminated by the silence discriminating means 5.

Figure 3:
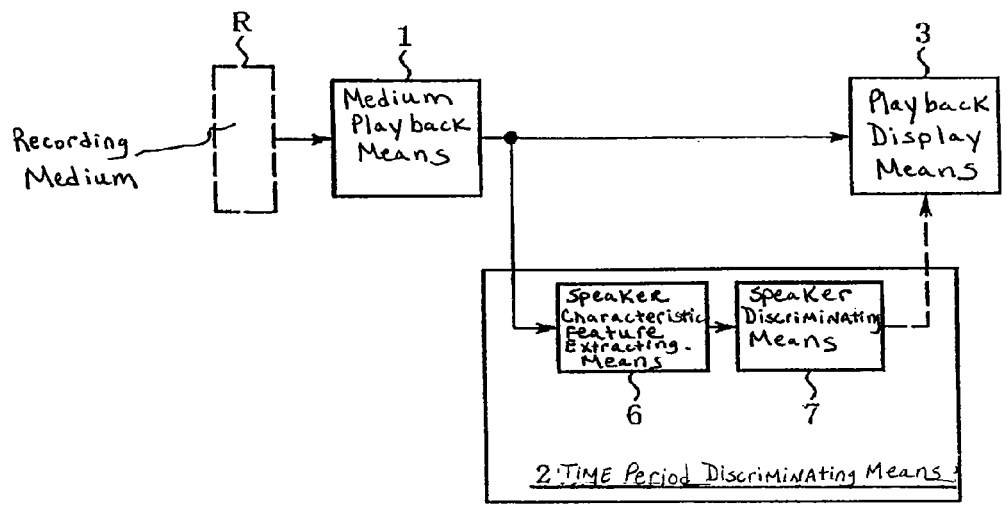
FIG. 3 is a block diagram illustrating a third embodiment.

FIG. 3 is a block diagram which illustrates the third embodiment of the invention.

The third embodiment is characterized by the fact that in the image playback device of the first embodiment, the time period discriminating means 2 is equipped with a speaker characteristic feature extracting means 6 which receives audio information from the recorded information read out by the medium playback means 1, and detects at least one characteristic feature parameter specifying long-term spectrum averages or mean pitch frequencies for the audio information; and a speaker discriminating means 7 which discriminates time periods during which the characteristic feature parameters detected by the speaker characteristic feature extracting means 6 show agreement with pre-registered characteristic feature parameters within permissible ranges, and by the fact that the playback display means 3 plays back and displays moving-picture image information contained in the recorded information only during time periods discriminated by the speaker discriminating means 7.

Figure 4:
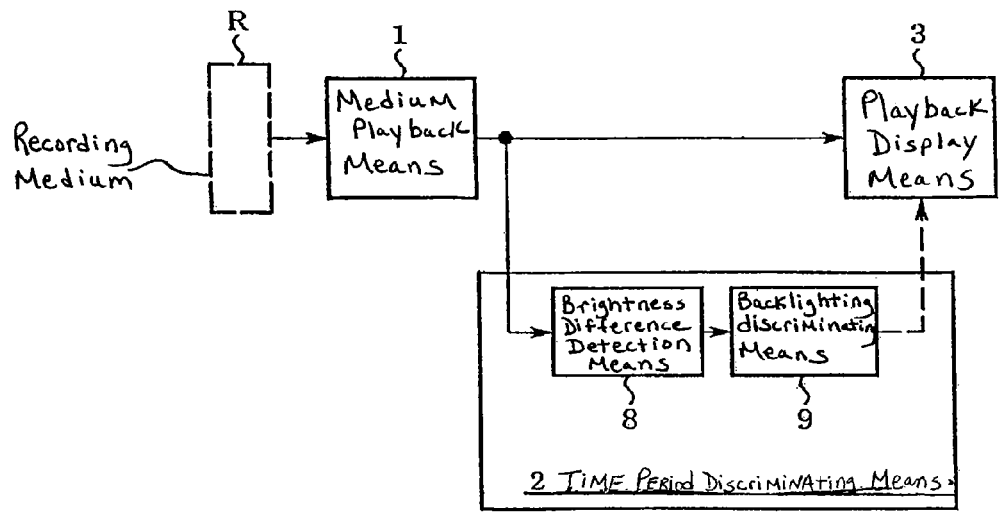
FIG. 4 is a block diagram illustrating a fourth embodiment.

FIG. 4 is a block diagram of the fourth embodiment of the invention.

The fourth embodiment is characterized by the fact that in the image playback device of the first embodiment, the time period discriminating means 2 is equipped with a brightness difference detection means 8 which inputs moving-picture image information from the recorded information read out by the medium playback means 1, and detects differences in the brightness level between central and peripheral portions of an image screen, and a backlighting discriminating means 9 which discriminates periods of backlighting (in which imaging is performed under backlit conditions) based on the brightness level differences detected by the brightness difference detection means 8, and by the fact that the playback display means 3 plays back and displays moving-picture image information contained in the recorded information only during time periods other than the periods of backlighting discriminated by the backlighting discriminating means 9.

Figure 5:
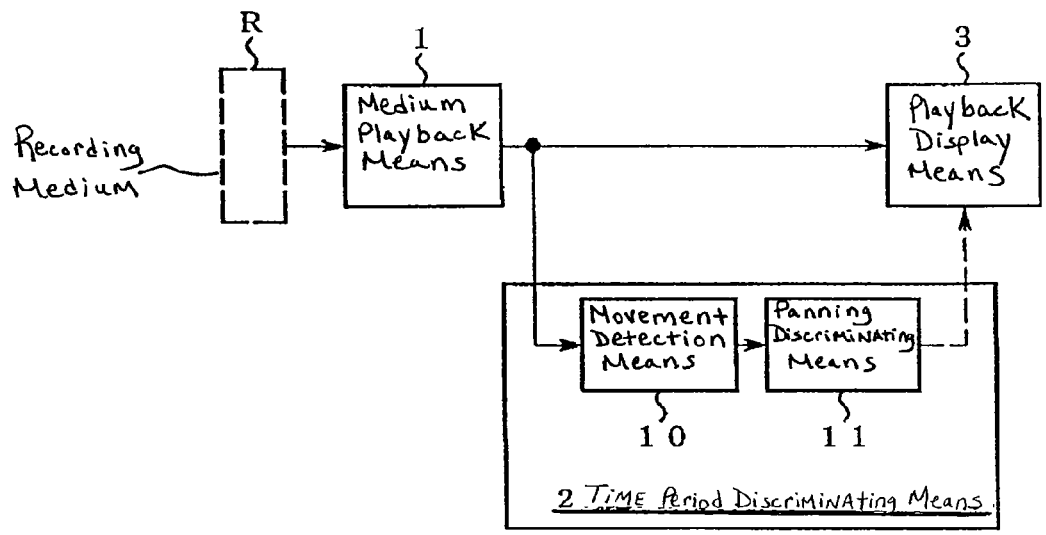
FIG. 5 is a block diagram illustrating a fifth embodiment.

FIG. 5 is a block diagram of a fifth embodiment of the invention.

The fifth embodiment is characterized by the fact that in the image playback device of the first embodiment, the time period discriminating means 2 is equipped with a movement detection means 10 which receives moving-picture image information from the recorded information read out by the medium playback means 1, and detects movement vectors between moving-picture frames, and a panning discriminating means 11 which discriminates panning periods (in which the screen as a whole moves horizontally) from the movement vectors detected by the movement detection means 10, and by the fact that the playback display means 3 acquires the panning periods discriminated by the panning discriminating means 11, and plays back and displays moving-picture image information contained in the recorded information only during the panning periods or during time periods other than the panning periods.

Figure 6:
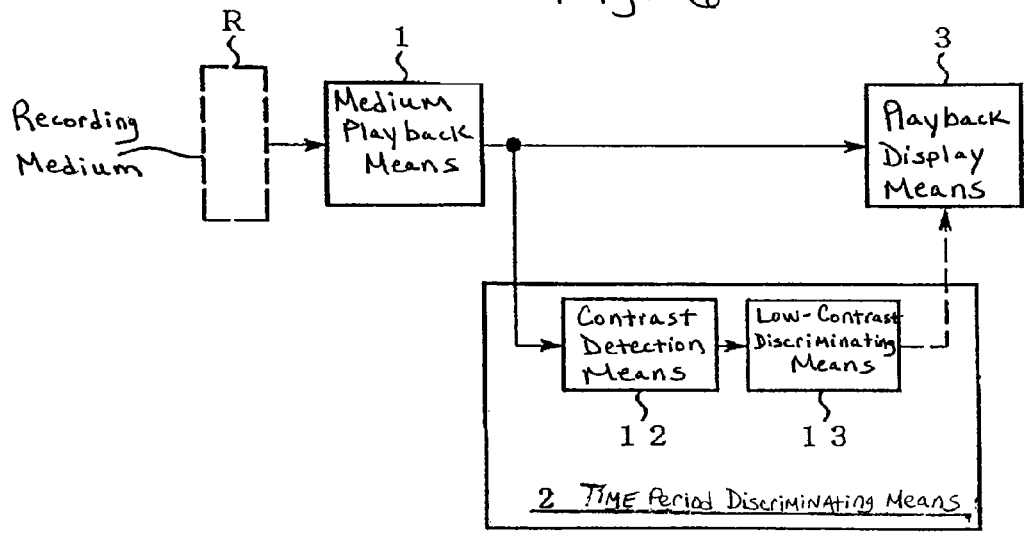
FIG. 6 is a block diagram illustrating a sixth embodiment.

FIG. 6 is a block diagram of the sixth embodiment of the invention.

The sixth embodiment is characterized by the fact that in the image playback device of the first embodiment, the time period discriminating means 2 is equipped with a contrast detection means 12 which receives moving-picture image information from the recorded information read out by the medium playback means 1, and detects the contrast of this moving-picture image information, and a low-contrast discriminating means 13 which discriminates low-contrast periods in which the contrast detected by the contrast detection means 12 drops below a predetermined threshold value, and by the fact that the playback display means 3 plays back and displays moving-picture image information contained in the recorded information only during time periods other than the low-contrast periods discriminated by the low-contrast discriminating means 13.

Figure 7:
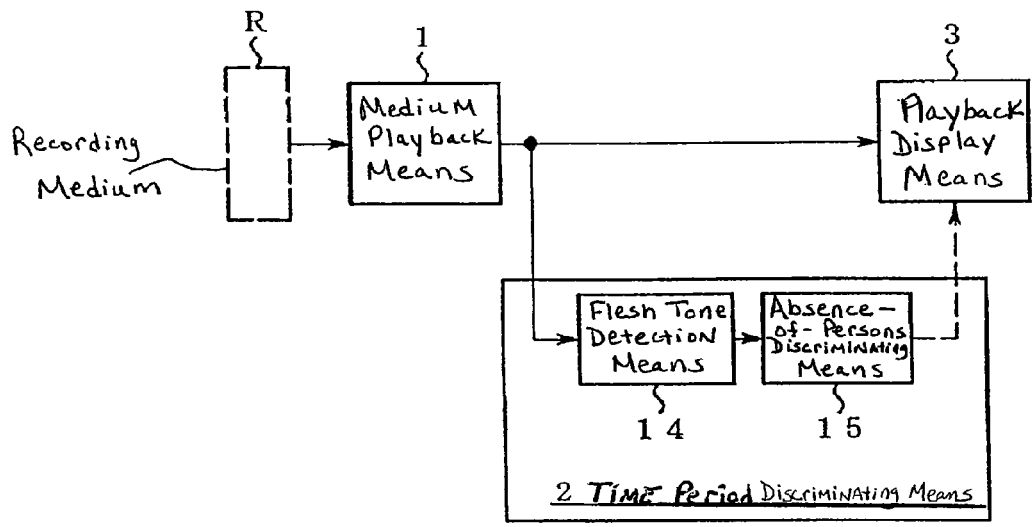
FIG. 7 is a block diagram illustrating a seventh embodiment.

FIG. 7 is a block diagram of the seventh embodiment of the invention.

The seventh embodiment is characterized by the fact that in the image playback device of the first embodiment, the time period discriminating means 2 is equipped with a flesh tone detection means 14 which receives moving-picture image information from the recorded information read out by the medium playback means 1, and detects flesh tone regions within the screen, and an absence-of-persons discriminating means 15 which discriminates periods of absence of persons in which the flesh tone regions detected by the flesh tone detection means 14 drop below a prescribed area, and by the fact that the playback display means 3 acquires the periods of absence of persons discriminated by the absence-of-persons discriminating means 15, and plays back and displays moving-picture image information contained in the recorded information only during these periods of absence of persons or during time periods other than these periods of absence of persons.

Figure 8:
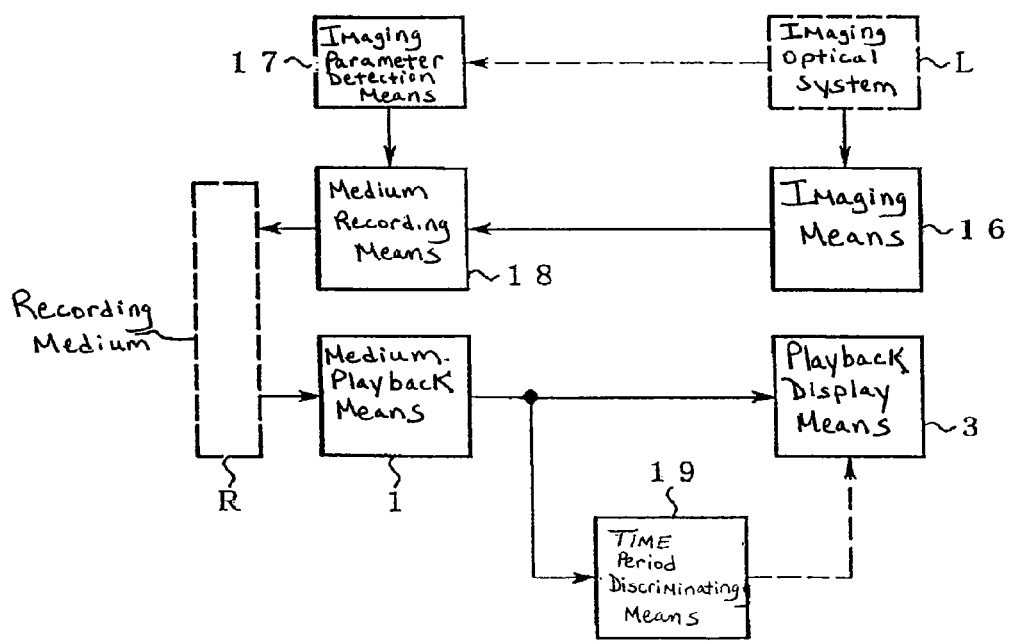
FIG. 8 is a block diagram illustrating an eighth embodiment.

FIG. 8 is a block diagram which illustrates the eighth embodiment of the invention.

The eight embodiment is characterized by the fact that an electronic camera is equipped with an imaging means 16 which produces moving-picture image information by imaging an object via an imaging optical system L, an imaging parameter detection means 17 which detects at least one imaging parameter of the imaging optical system L, a medium recording means 18 which inputs moving-picture image information produced by the imaging means 16 and imaging parameters detected by the imaging parameter detection means 17, and records such moving-picture image information and imaging parameter on a recording medium R as recorded information, a medium playback means 1 which reads out the recorded information from the recording medium R, a time period discriminating means 19 which receives at least one imaging parameter from the recorded information read out by the medium playback means 1, and discriminates time periods during which such imaging parameters agree with certain pre-set conditions, and a playback display means 3 which plays back and displays moving-picture image information contained in the recorded information in accordance with the results of the discrimination performed by the time period discriminating means 19.

In one of its implementations, the eight embodiment is characterized by the fact that in the electronic camera, the imaging parameter detection means 17 detects focal point adjustment conditions of the imaging optical system L as imaging parameters, the time period discriminating means 19 receives the focal point adjustment conditions from the recorded information read out by the medium playback means 1, and discriminates out-of-focus periods in which the focal point adjustment conditions show an out-of-focus state, and the playback display means 3 plays back and displays moving-picture image information contained in the recorded information only during time periods other than the out-of-focus periods detected by the time period discriminating means 19.

In another of its implementations, the eighth embodiment is characterized by the fact that in the electronic camera, the imaging parameter detection means 17 detects the lens position inside a mirror tube of the imaging optical system L as an imaging parameter, the time period discriminating means 19 receives the lens position from the recorded data read out by the medium playback means 1, and discriminates point-blank periods in which the lens position is at the point-blank (close distance) end, and the playback display means 3 plays back and displays moving-picture image information contained in the recorded information only during time periods other than the point-blank periods discriminated by the time period discriminating means 19.

In another of its implementations, the eighth embodiment is characterized by the fact that in the electronic camera, the imaging parameter detection means 17 detects the lens position inside a mirror tube of the imaging optical system L as an imaging parameter, the time period discriminating means 19 receives the lens position from the recorded data read out by the medium playback means 1, and discriminates periods of infinite distance in which the lens position is at the infinite distance end, and the playback display means 3 plays back and displays moving-picture image information contained in the recorded information only during the periods of infinite distance discriminated by the time period discriminating means 19 or during time periods other than the periods of infinite distance.

Figure 9:
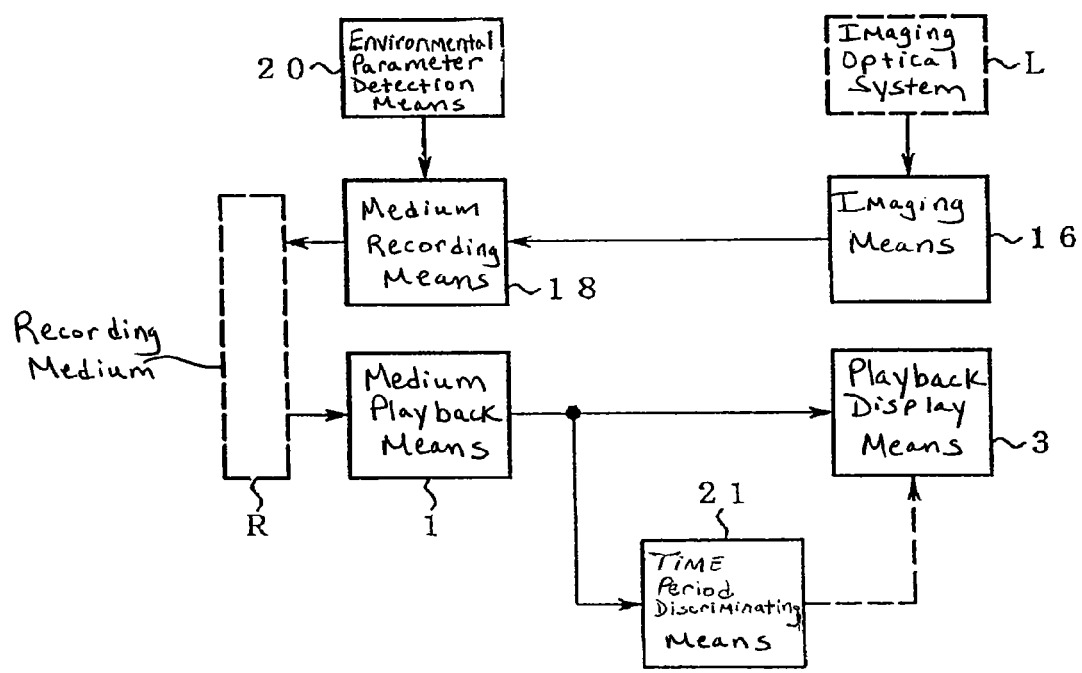
FIG. 9 is a block diagram illustrating a ninth embodiment.

FIG. 9 is a block diagram of the ninth embodiment of the invention.

The ninth embodiment is characterized by the fact that an electronic camera of this invention is equipped with an imaging means 16 which produces moving-picture image information by imaging an object via an imaging optical system L, an environmental parameter detection means 20 which detects at least one environmental parameter indicative of the surrounding environment at the time of imaging, a medium recording means 18 which inputs moving-picture image information produced by the imaging means 16 and environmental parameters detected by the environmental parameter detection means 20, and records such moving-picture image information and environmental parameters on a recording medium R as recorded information, a medium playback means 1 which reads out the recorded information from the recording medium R, a time period discriminating means 21 which receives the environmental parameters from the recorded information read out by the medium playback means 1, and discriminates time periods during which these environmental parameters agree with certain pre-set conditions, and a playback display means 3 which plays back and displays moving-picture image information contained in the recorded information in accordance with the results of the discrimination performed by the time period discriminating means 21.

Figure 10:
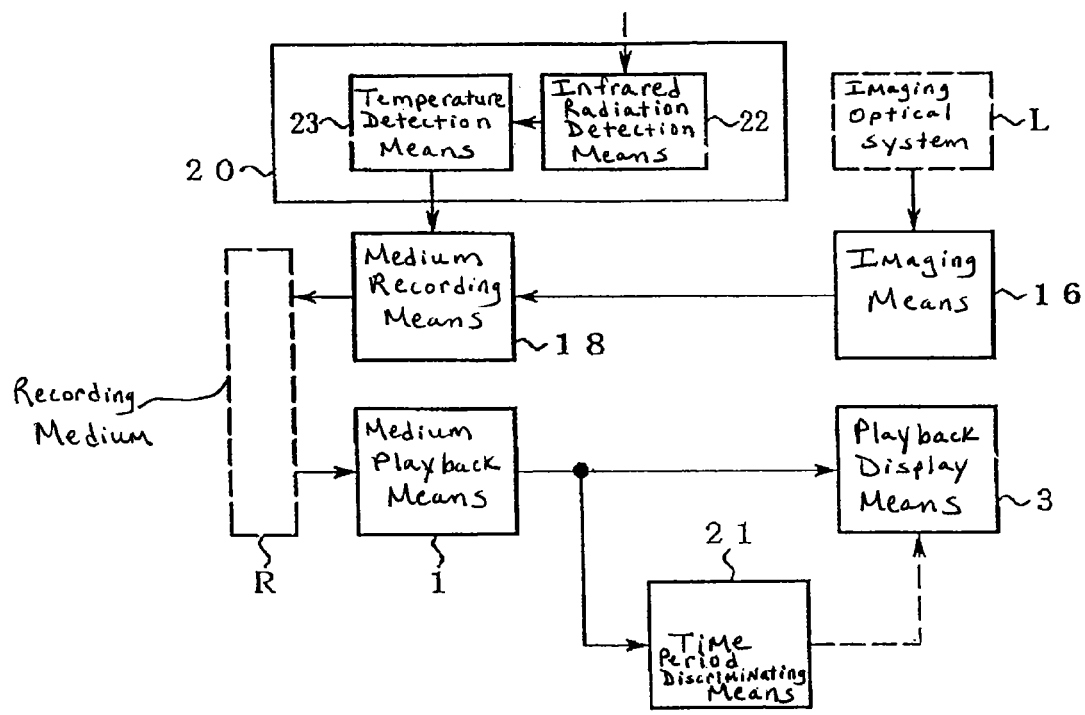
FIG. 10 is a block diagram illustrating a tenth embodiment.

FIG. 10 is a block diagram which illustrates the tenth embodiment of the invention.

The tenth embodiment is characterized by the fact that in the electronic camera of the ninth embodiment, the environmental parameter detection means 20 is equipped with an infrared radiation detection means 22 which detects infrared radiation from an imaged object field, and a temperature detection means 23 which detects the temperature of the object in accordance with the infrared radiation detected by the infrared radiation detection means 22, and uses this temperature of the object as an environmental parameter, by the fact that the time period discriminating means 21 receives the temperature of the object from the recorded information read out by the medium playback means 1, and discriminates periods in which the temperature of the object is within a predetermined temperature range, and the playback display means 3 plays back and displays moving-picture image information contained in the recorded information only during the periods discriminated by the time period discriminating means 21 or during time periods other than the periods discriminated by the time period discriminating means 21.

In the image playback device of FIG. 1, recorded information is read out from the recording medium R via the medium playback means 1.

The time period discriminating means 2 discriminates this recorded information using pre-set conditions, and determines time periods in which the recorded information shows agreement with these conditions within the playback period of the recorded information.

The playback display means 3 plays back and displays moving-picture image information contained in the recorded information in accordance with the results of such a discrimination.

Furthermore, it is sufficient if the playback display means 3 used here is a means which produces an image output, etc., that is provided to an image display device; it is not necessary to include such an image display device itself.

In the image playback device of FIG. 2, the time period discriminating means 2 is constructed from a sound quantity detection means 4 and a silence discriminating means 5.

This sound quantity detection means 4 inputs audio information from the recorded information, and detects the sound quantity of this audio information.

The silence discriminating means 5 discriminates silent periods in which the above-mentioned sound quantity drops below a predetermined sound quantity.

The playback display means 3 plays back and displays moving-picture image information contained in the recorded information, with the above-mentioned silent periods omitted.

As a result of such an action, moving-picture image information can be played back and displayed with an emphasis on conversational portions or narration portions contained in the recorded information. Accordingly, the operator can obtain a rough grasp of the contents of the recorded information (story or flow of conversation) without playing back the recorded information over the entire time period of this recorded information.

In the image playback device of FIG. 3, the time period discriminating means 2 is constructed from a speaker characteristic feature extracting means 6 and a speaker discriminating means 7.

The speaker characteristic feature extracting means 6 inputs audio information from the recorded information, and detects characteristic feature parameters (long-term spectrum averages or mean pitch frequencies) of this audio information.

The speaker discriminating means 7 discriminates periods in which these characteristic feature parameters agree with registered characteristic feature parameters within a permissible range.

The playback display device 3 plays back and displays moving-picture contained in the recorded information only during these periods of agreement.

As a result of such an action, moving-picture image information can be played back and displayed with an emphasis on conversations of specified speakers, etc., within the recorded information. Accordingly, the operator can observe moving-picture image information with an emphasis on specified speakers.

In the image playback device of FIG. 4, the time period discriminating means 2 is constructed from a brightness difference detection means 8 and a backlighting discriminating means 9.

This brightness difference detection means 8 inputs moving-picture image information from the recorded information, and detects differences in the brightness level between central and peripheral portions of the image screen.

The backlighting discriminating means 9 discriminates backlighting periods (in which imaging is performed in a backlit state) based on the brightness level differences.

The playback display means 3 plays back and displays moving-picture image information contained in the recorded information, with the backlighting periods omitted.

As a result of such an action, moving-picture image information is played back and displayed with portions consisting of backlit imaging omitted. Accordingly, the operator can observe moving-picture image information with periods of faulty imaging, etc., caused by backlighting omitted.

In the image playback device of FIG. 5, the time period discriminating means 2 is constructed from a movement detection means 10 and a panning discriminating means 11.

The movement detection means 10 inputs moving-picture image information from the recorded information, and detects movement vectors between moving-picture frames.

The panning discriminating means 11 discriminates panning periods (in which the image screen as a whole moves horizontally) from the movement vectors.

The playback display means 3 plays back and displays moving-picture image information contained in the recorded information only during such panning periods or during time periods other than these panning periods.

Here, in cases where playback and display are performed only during panning periods, the operator can view moving-picture image information with an emphasis on scenes from car windows, etc.

On the other hand, in cases where playback and display are performed only during time periods other than panning periods, the operator can view moving-picture image information with unnecessary panning portions (generated when scenes separated by a distance are connected), etc., excluded.

In the image playback device of FIG. 6, the time period discriminating means 2 is constructed from a contrast detection means 12 and a low-contrast discriminating means 13.

The above-mentioned contrast detection means 12 inputs moving-picture image information from the recorded information, and detects the contrast of this moving-picture image information.

The low-contrast discriminating means 13 discriminates low-contrast periods in which the contrast drops below a predetermined threshold value.

The playback display means 3 plays back and displays moving-picture image information contained in the recorded information, with the low-contrast periods omitted.

As a result of this action, moving-picture image information is played back and displayed with low-contrast portions omitted. Accordingly, the operator can view moving-picture image information with low-contrast portions in which the main object of imaging is not present (as in images of blank walls, for example) omitted.

In the image playback device of FIG. 7, the time period discriminating means 2 is constructed from a flesh tone detection means 14 and an absence-of-persons discriminating means 15.

The flesh tone detection means 14 inputs moving-picture image information from the recorded information, and detects regions corresponding to flesh tones (hereafter referred to as "flesh tone regions") within the image screen.

The absence-of-persons discriminating means 15 discriminates periods of absence of persons in which the flesh tone regions drop below a prescribed area.

The playback display means 3 plays back and displays moving-picture image information contained in the recorded information only during such periods of absence of persons or during time periods other than these periods of absence of persons.

Here, in cases where playback and display are performed only during periods of absence of persons, the operator can view moving-picture image information with an emphasis on portions of the image information in which no persons are present, such as background images, etc.

On the other hand, in cases where playback and display are performed only during time periods other than the above-mentioned periods of absence of persons, the operator can view moving-picture image information with an emphasis on portions of the image information in which persons are imaged.

In the electronic camera of FIG. 8, the imaging parameter detection means 17 detects imaging parameters which indicate the conditions of the imaging optical system L, etc., during imaging.

The medium recording means 18 records such imaging parameters on the recording medium R together with moving-picture image information.

At the time of playback, the time period discriminating means 19 inputs at least one imaging parameter from the recorded information that is read out. The time period discriminating means 19 discriminates such imaging parameters using pre-set conditions, and determines time periods in which the parameters agree with these conditions within the playback period of the recorded information.

The playback display means 3 plays back and displays moving-picture image information contained in the recorded information in accordance with the results of such a discrimination.

Furthermore, it is sufficient if the playback display means 3 used here is a means which produces an image output, etc., that is provided to an image display device; it is not particularly necessary to include such an image display device itself.

In one the implementations of the eighth embodiment, focal point adjustment conditions of the imaging optical system L are recorded together with moving-picture image information at the time of imaging.

The time period discriminating means 19 inputs the focal point adjustment conditions from the recorded information, and discriminates out-of-focus periods in which the focal point adjustment conditions show an out-of-focus state.

The playback display means 3 plays back and displays moving-picture image information only during time periods other than such out-of-focus periods.

As a result of such an action, moving-picture image information is played back and displayed with out-of-focus portions omitted. Accordingly, the operator can view moving-picture image information with periods of faulty imaging, etc., caused by improper focusing omitted.

Furthermore, in regard to the above-mentioned focal point adjustment conditions, it is possible to use either a numerical value which indicates the amount of defocusing, etc., or flag information which indicates whether or not an out-of-focus state exists, etc.

In another implementation of the eighth embodiment, the lens position of the imaging optical system L is recorded together with moving-picture image information at the time of imaging.

At the time of playback, the time period discriminating means 19 inputs the lens position from the recorded information, and discriminates point-blank periods in which this lens position shows a position at the point-blank end.

The playback display means 3 plays back and displays moving-picture image information only during time periods other than these point-blank periods.

As a result of such an action, moving-picture image information is played back and displayed with portions imaged under conditions in which the lens position of the imaging optical system L is at the point-blank end omitted. Accordingly, moving-picture image information can be viewed with images of obstacles, etc., passing immediately in front of the electronic camera omitted.

In another implementation of the eighth embodiment, the lens position of the imaging optical system L is recorded together with moving-picture image information at the time of imaging.

At the time of playback, the time period discriminating means 19 inputs the lens position from the recorded information, and discriminates periods of infinite distance in which this lens position shows a position at the infinite distance end.

The playback display means 3 plays back and displays moving-picture image information only during such periods of infinite distance or during time periods other than such periods of infinite distance.

Here, in cases where playback and display are performed only during the periods of infinite distance, the operator can view moving-picture image information with an emphasis on objects that are imaged at the infinite distance end, such as scenery, etc.

On the other hand, in cases where playback and display are performed only during time periods other than the periods of infinite distance, the operator can view moving-picture image information with objects of imaging that are imaged at the infinite distance end, such as scenery, etc., omitted.

In the electronic camera of FIG. 9, the environmental parameter detection means 20 detects environmental parameters indicative of the surrounding environment at the time of imaging.

The medium recording means 18 records such environmental parameters on the recording medium R together with moving-picture image information.

At the time of playback, the time period discriminating means 21 inputs the environmental parameters from the recorded information that is read out. The time period discriminating means discriminates these environmental parameters using pre-set conditions, and determines periods in which these parameters show agreement with the above-mentioned conditions during the playback period of the recorded information.

The playback display means 3 plays back and displays moving-picture image information contained in the recorded information in accordance with the results of such a discrimination.

Furthermore, it is sufficient if the playback display means 3 used here is a means which produces an image output, etc., that is provided to an image display device; it is not particularly necessary to include such an image display device itself.

In the electronic camera of FIG. 10, the environmental parameter detection means 20 is constructed from an infrared radiation detection means 22 and a temperature detection means 23.

The infrared radiation detection means 22 detects infrared radiation from the image field at the time of imaging.

The temperature detection means 23 detects a numerical value which is convertible into the surface temperature of the object (hereafter, this numerical value will be referred to as the "temperature of the object") based on the above-mentioned infrared radiation.

The medium recording means 18 records this temperature of the object on the recording medium R together with moving-picture image information.

At the time of playback, the time period discriminating means 21 inputs the temperature of the object from the recorded information. The time period discriminating means 21 discriminates periods during which the temperature of the object is within a predetermined temperature range.

The playback display means 3 plays back and displays moving-picture image information contained in the recorded information only during the periods discriminated by the time period discriminating means 21 or during time periods other than the periods discriminated by the time period discriminating means 21.

As a result of such an action, moving-picture image information can be viewed with an emphasis on objects that exhibit a temperature within a specified range, or on objects other than such objects.

Illustrative implementations of the invention will now be described.

Figure 11:
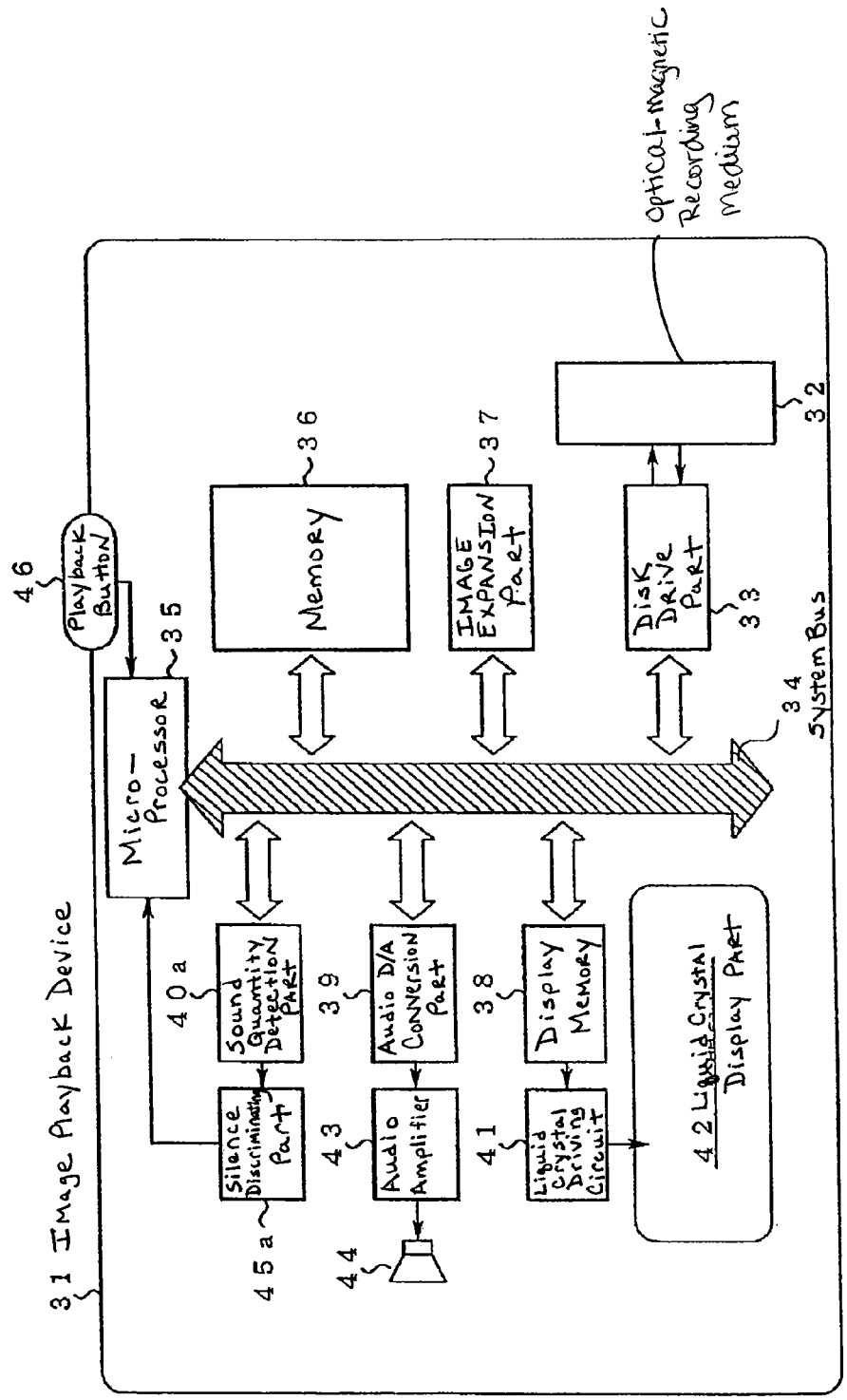
FIG. 11 is a block diagram illustrating a first illustrative implementation of the invention.

FIG. 11 is a block diagram which illustrates a first illustrative implementation of the invention (corresponding to FIG. 2).

Figure 12:
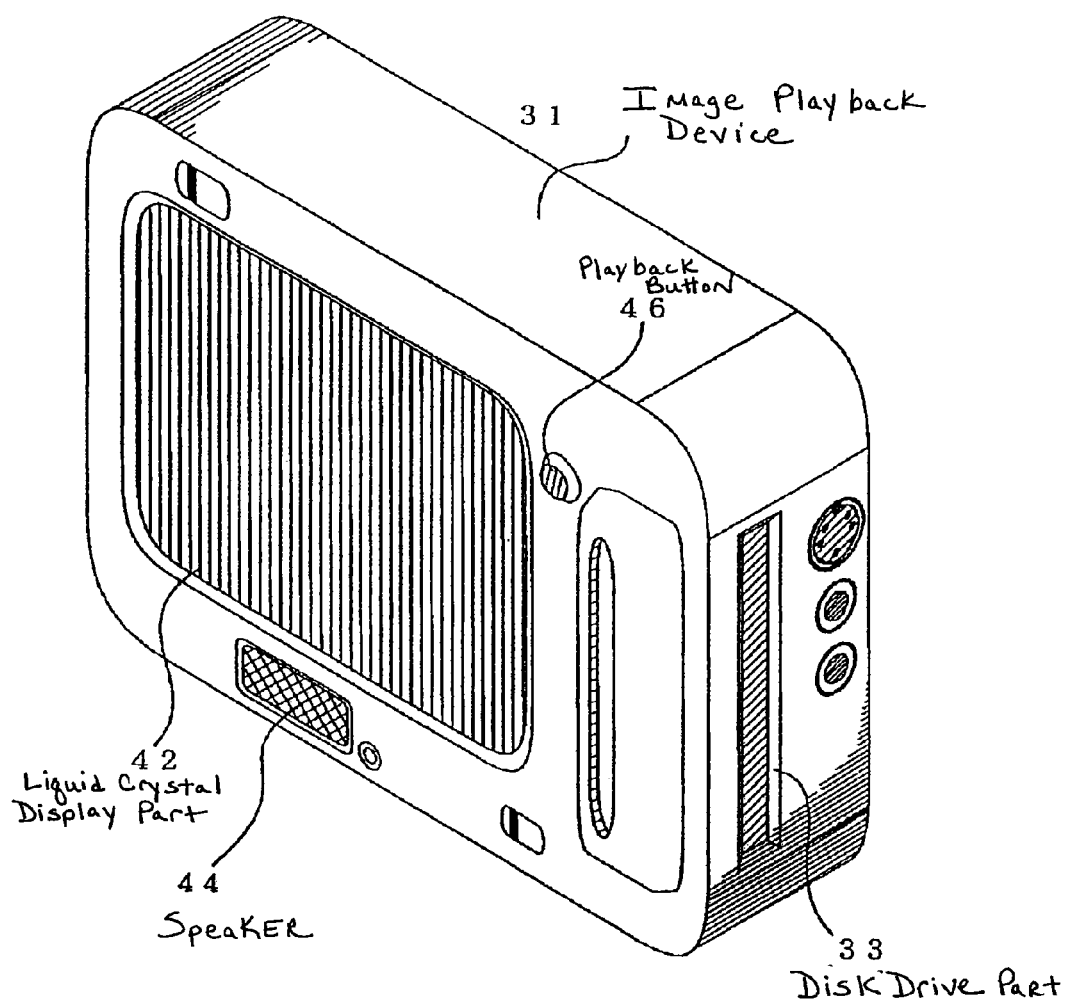
FIG. 12 is a perspective view illustrating the external appearance of the first illustrative implementation of the invention.

FIG. 12 is a perspective view which illustrates the external appearance of the present illustrative implementation of the invention.

In these figures, a disk drive part 33 in which an optical-magnetic recording medium 32 is mounted in a freely detachable manner is installed in the image playback device 31. This disk drive part 33 is connected to a micro-processor 35 via a system bus 34.

Furthermore, a memory 36, an image expansion part 37, a display memory 38, an audio D/A conversion part 39 and a sound quantity detection part 40*a* are individually connected to the system bus 34.

A liquid crystal display part 42 is connected to the display memory 38 via a liquid crystal driving circuit 41.

A speaker 44 is connected to the audio D/A conversion part 39 via an audio amplifier 43.

The output of the sound quantity detection part 40*a* is input into the micro-processor 35 via a silence discriminating part 45*a*.

Furthermore, a playback button 46 is installed in the housing of the image playback device 31, and the output of this playback button 46 is input into the micro-processor 35.

Here, in regard to the correspondence between the invention shown in FIG. 2 and the first illustrative implementation of the invention shown in FIG. 11, the medium playback means 1 corresponds to the disk drive part 33, the time period discriminating means 2 corresponds to the sound quantity detection part 40*a* and silence discriminating part 45*a*, and the playback display means 3 corresponds to the image expansion part 37, display memory 38, liquid crystal driving circuit 41 and the micro-processor 35.

The operation of the first illustrative implementation of the invention will be described with reference to FIGS. 11 through 13.

First, when the main power supply of the image playback device 31 is switched on, the micro-processor enters a waiting state until the playback button 46 is switched on.

When the playback button 46 is switched on (FIG. 13 S1) in this state, the micro-processor 35 instructs the disk drive part 33 to read out image files.

Figure 13:
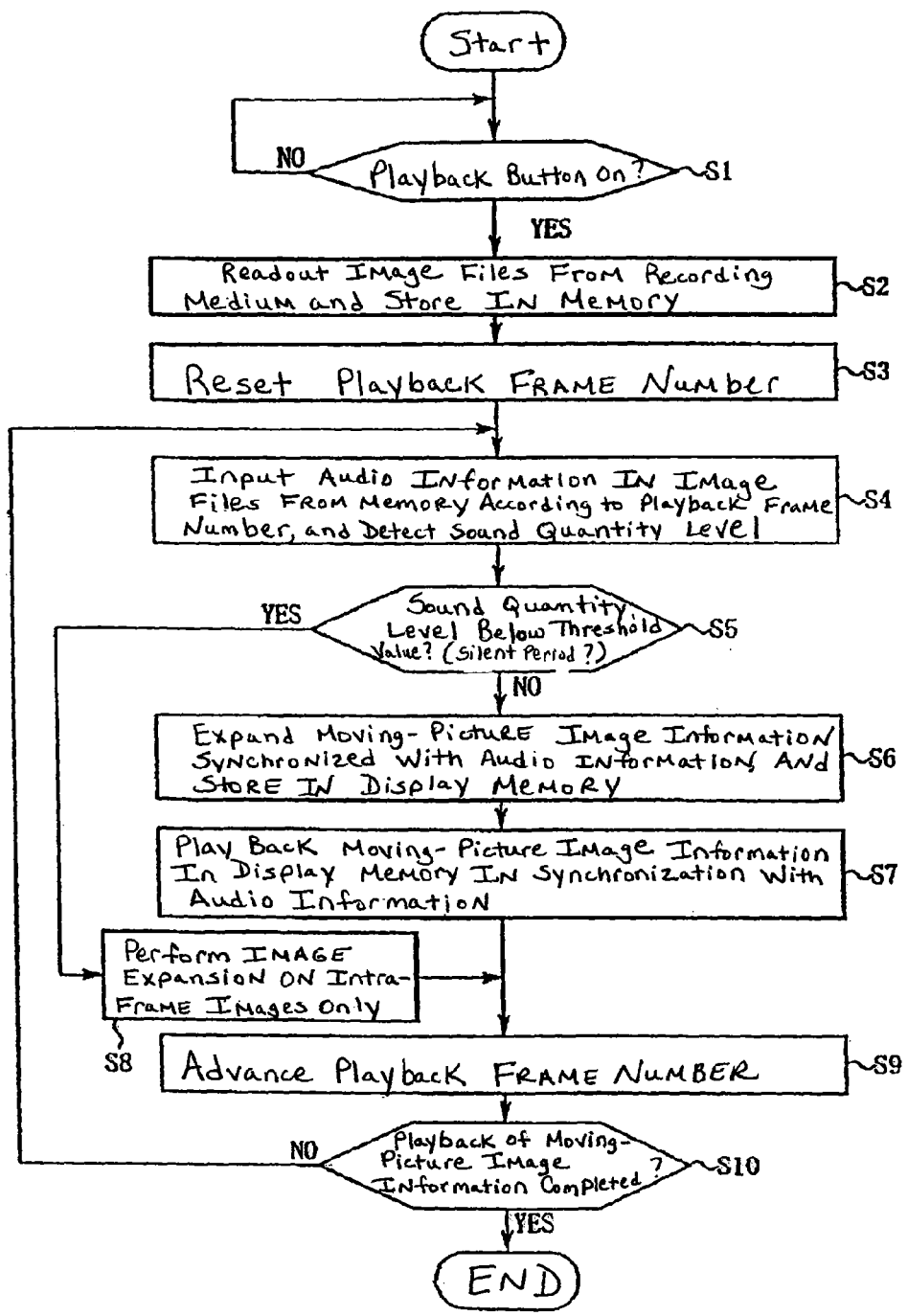
FIG. 13 is a flow chart illustrating the operation of the first illustrative implementation of the invention.

The disk drive part 33 reads out image files from the optical-magnetic recording medium 32, and successively stores these image files in the memory 36 (FIG. 13 S2).

Meanwhile, the micro-processor 35 resets the playback frame numbers of the image files stored at prescribed addresses in the memory 36 (FIG. 13 S3).

The sound quantity detection part 40*a* inputs audio information (recorded in synchronization with the images having the above-mentioned playback frame numbers) from the image files at fixed intervals, and detects the sound quantity level of this audio information (FIG. 13 S4).

The silence discriminating part 45*a* ascertains whether or not the above-mentioned sound quantity level has dropped below a predetermined threshold value (FIG. 13 S5).

Here, if the sound quantity level exceeds the above-mentioned predetermined threshold value (No side of FIG. 13 S5), the micro-processor 35 instructs the image expansion part 37 to perform image expansion. The image expansion part 37 inputs moving-picture image information indicated by the above-mentioned playback frame numbers from the image files, performs image expansion, and stores the information in the display memory 38 (FIG. 13 S6).

The liquid crystal driving circuit 41 reads out the moving-picture image information in the display memory 38 at the rate of every other frame period, and displays this information on the liquid crystal display part 42 (FIG. 13 S7). In this case, audio information which is synchronized with the moving-picture image information is played back together with the moving-picture image information by means of the audio D/A conversion part 39 and audio amplifier 43.

On the other hand, in cases where the sound quantity level is below the above-mentioned predetermined threshold value (YES side of FIG. 13 S5), the image expansion part 37 performs only intra-frame image expansion, and the resulting information is temporarily recorded in a working memory within the image expansion part 37 (FIG. 13 S8). These intra-frame images are images obtained by intra-frame compression at fixed frame intervals within the moving-picture image information, and are images necessary for the image expansion of other images (images subjected to inter-frame compression).

Following the completion of such processing (FIG. 13 S7 or S8), the micro-processor 35 advances the playback frame number by one step (FIG. 13 S9).

Here, in cases where the playback of the moving-picture image information has not been completed (NO side of FIG. 13 S10), the operation returns to the processing of FIG. 13 S4, and the operations described above are repeated.

On the other hand, when the playback of moving-picture image information is completed to the last frame number (YES side of FIG. 13 S10), the image file playback operation is completed. Furthermore, at this time, the temporary recording of intra-frame images is also erased.

As a result of the above operation, image files are not played back and displayed in the case of silent periods in which the sound quantity level is below the above-mentioned threshold value; instead, only the playback frame numbers increase at a high rate. Accordingly, moving-picture image information in time periods other than the above-mentioned silent periods can be selectively played back and displayed.

Furthermore, as a result of such playback and display, image files can be played back and displayed with an emphasis on conversational portions or narration portions, etc., contained in the image files. Accordingly, the operator can obtain a quick grasp of the flow of stories or conversation, etc., without having to view all of the image files.

Figure 14:
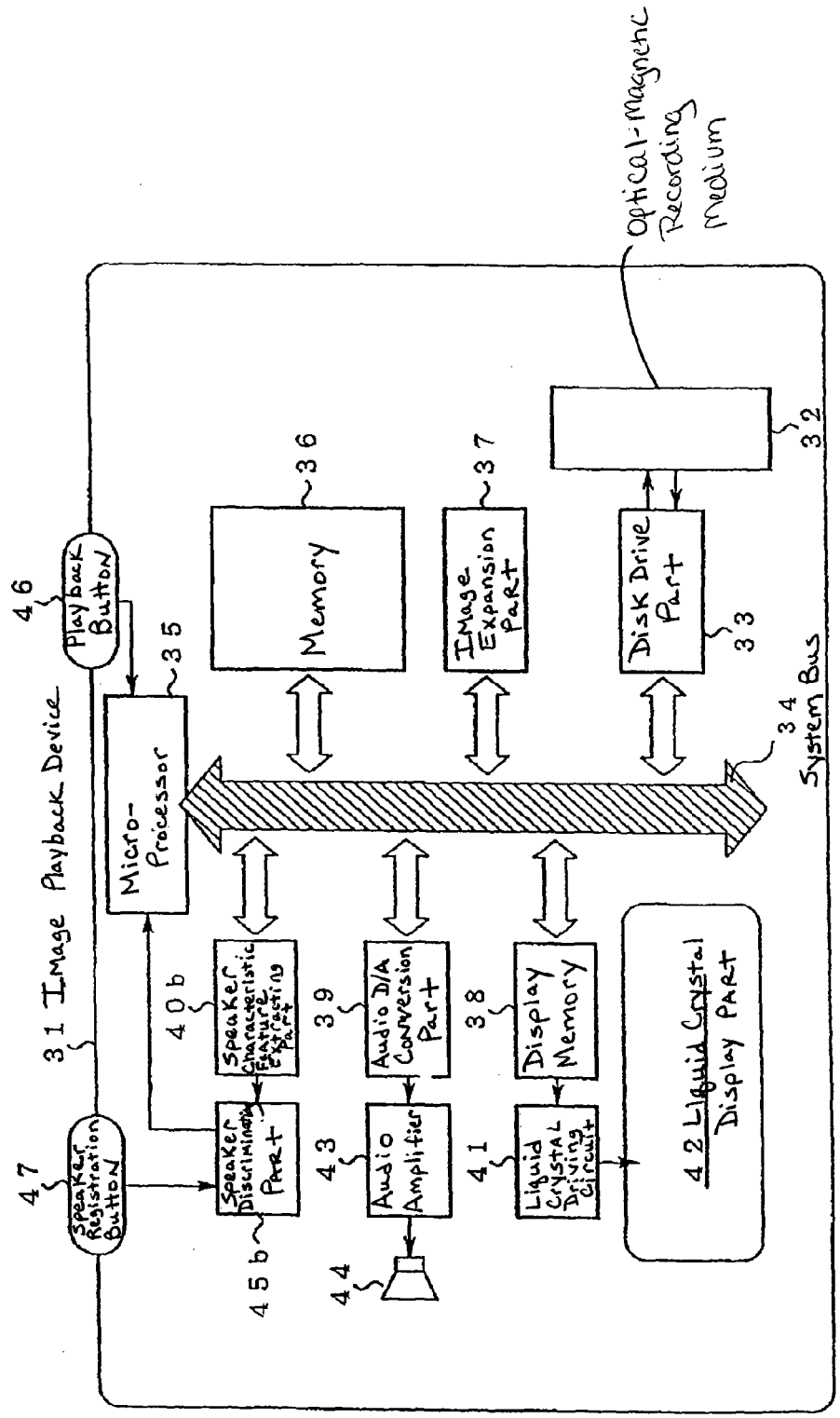
FIG. 14 is a block diagram illustrating a second illustrative implementation of the invention.

FIG. 14 is a block diagram of a second illustrative implementation of the invention (corresponding to FIG. 3).

The structural special features of the second illustrative implementation of the invention are as follows:

(1) A speaker characteristic feature extracting part 40*b* and a speaker discriminating part 45*b* are respectively installed instead of the sound quantity detection part 40*a* and silence discriminating part 45*a* shown in FIG. 11.

(2) A speaker registration button 47 is installed in the housing of the image playback device 31, and the output of this speaker registration button 47 is input into the speaker discriminating part 45*b*.

Constituent elements which are the same as constituent elements shown in FIG. 11 are labeled with the same reference numbers in FIG. 14, and a description of the construction of such elements is omitted here.

Here, in regard to the correspondence between the invention shown in FIG. 3 and the second illustrative implementation of the invention shown in FIG. 14, the medium playback means 1 corresponds to the disk drive part 33, the time period discriminating means 2 corresponds to the speaker characteristic feature extracting part 40*b* and speaker discriminating part 45*b*, and the playback display means 3 corresponds to the image expansion part 37, display memory 38, liquid crystal driving circuit 41 and the micro-processor 35.

The operation of the second illustrative implementation of the invention will be described with reference to FIGS. 14 and 15.

First, when the main power supply of the image playback device 31 is switched on, the micro-processor 35 enters a waiting state until the playback button 46 is switched on.

When the playback button 46 is switched on (FIG. 15 S1) in this state, the micro-processor 35 instructs the disk drive part 33 to read out image files.

Figure 15:
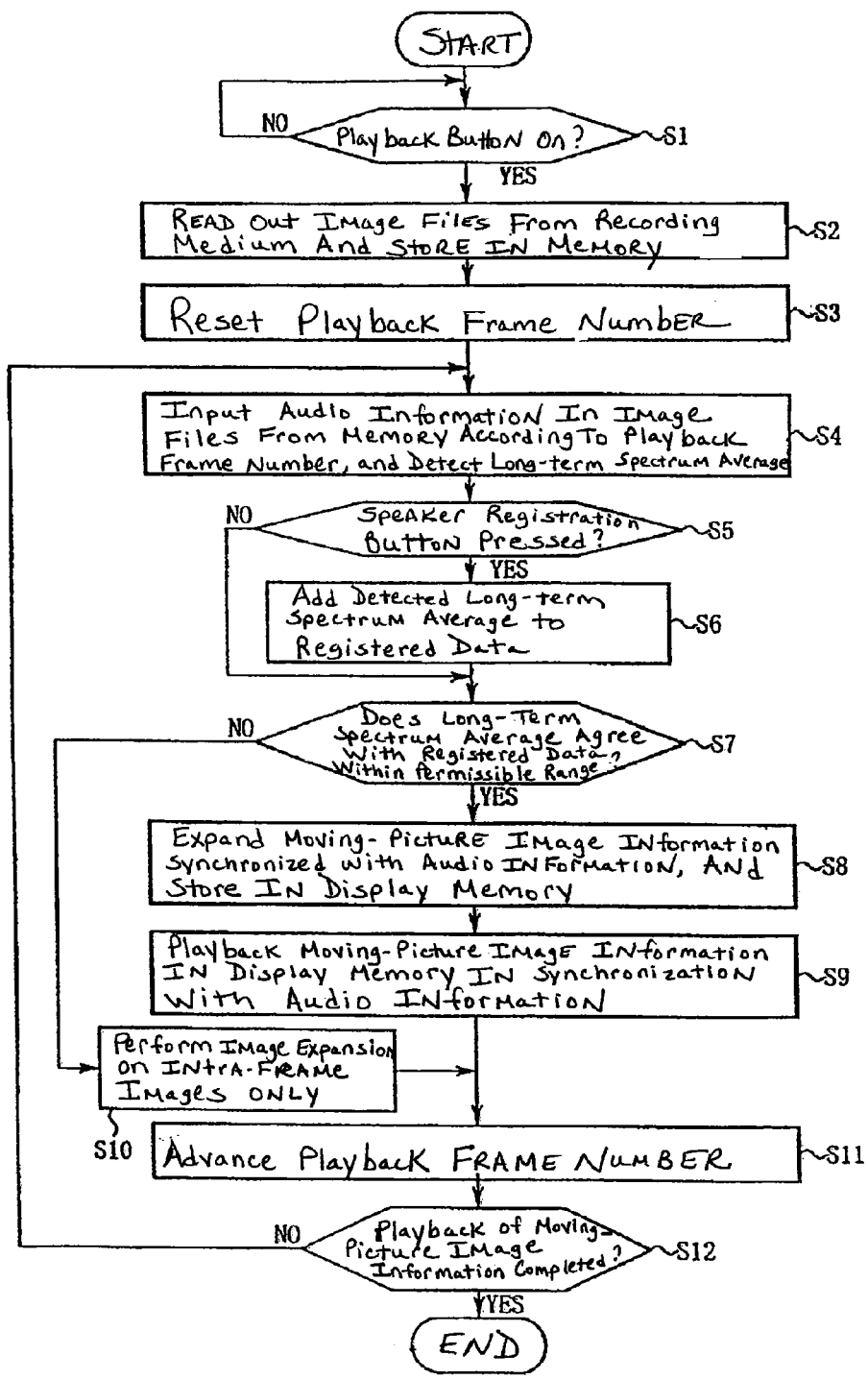
FIG. 15 is a flow chart illustrating the operation of the second illustrative implementation of the invention.

The disk drive part 33 reads out image files from the optical-magnetic recording medium 32, and successively stores these image files in the memory 36 (FIG. 15 S2).

Meanwhile, the micro-processor 35 resets the playback frame numbers of the image files stored at prescribed addresses in the memory 36 (FIG. 15 S3).

The speaker characteristic feature extracting part 40*b* inputs audio information (recorded in synchronization with the images having the above-mentioned playback frame numbers) from the image files in the memory 36 at fixed intervals, and detects universally known long-term spectrum averages (FIG. 15 S4).

When the speaker registration button 47 is pressed in this state (FIG. 15 S5), the speaker discriminating part 45*b* stores the detected long-term spectrum average data as registered data (FIG. 15 S6).

Here, the speaker discriminating part 45*b* ascertains whether or not detected long-term spectrum average data agrees with the above-mentioned registered data within a permissible range (FIG. 15 S 7). Furthermore, in cases where the registered data has not been registered, the speaker discriminating part 45*b* makes a uniform judgment of "agreement".

If characteristic feature parameters show agreement within a permissible range (YES side of FIG. 15 S7), the micro-processor 35 instructs the image expansion part 37 to perform image expansion. The image expansion part 37 inputs moving-picture image information (indicated by playback frame numbers) from image files, performs image expansion, and transfers the information to the display memory 38 (FIG. 15 S8).

The liquid crystal driving circuit 41 reads out the moving-picture image information in the display memory 38 at the rate of every other frame period, and displays this information on the liquid crystal display part 42 (FIG. 15 S9). In this case, audio information which is synchronized with the moving-picture image information is played back together with the moving-picture image information by means of the audio D/A conversion part 39 and audio amplifier 43.

In cases where the long-term spectrum average data does not agree with the registered data within the above-mentioned permissible range (No side of FIG. 15 S7), the image expansion part 37 expands only the intra-frame images required for the image expansion of the preceding and following frames. This intra-frame image [information] is temporarily recorded in the image expansion part 37 (FIG. 15 S10). Here, since the intra-frame images are not stored in the display memory 38, these images are not played back and displayed.

After such processing (FIG. 15 S9 or S10) has been completed, the micro-processor 35 advances the playback frame number by one step (FIG. 15 S18).

Here, in cases where the playback of the moving-picture image information has not been completed (No side of FIG. 15 S12), the operation returns to the processing of FIG. 15 S4, and the operations described above are repeated.

On the other hand, when the playback of moving-picture image information is completed to the last frame number (YES side of FIG. 15 S12), the image file playback operation is completed. Furthermore, at this time, the temporary recording of intra-frame images is also erased.

As a result of the above operation, image files are not played back and displayed during time periods other than periods of conversation by specified speakers; instead, only the frame numbers change at a high rate. Consequently, playback and display are performed with an emphasis on moving-picture image information corresponding to periods of conversation by specified speakers.

Accordingly, the operator can view moving-picture image information selectively, with an emphasis on conversation by specified speakers.

Figure 16:
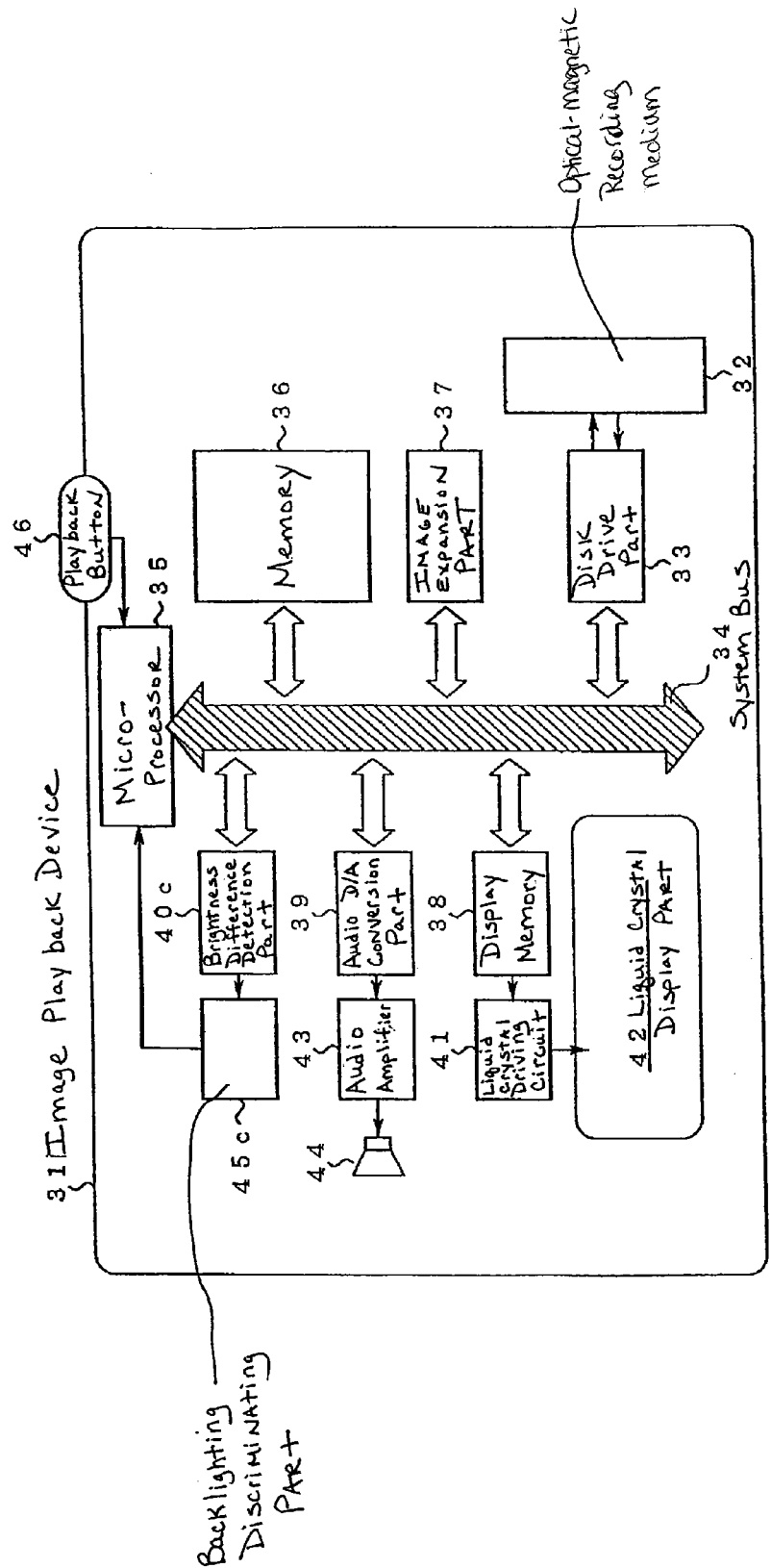
FIG. 16 is a block diagram of a third illustrative implementation of the invention.

FIG. 16 is a block diagram of a third illustrative implementation of the invention (corresponding to FIG. 4).

In structural terms, this third illustrative implementation of the invention is characterized by the fact that a brightness difference detection part 40*c* and a backlighting discriminating part 45*c* are respectively installed instead of the sound quantity detection part 40*a* and silence discriminating part 45*a* shown in FIG. 11.

Furthermore, constituent elements which are the same as constituent elements shown in FIG. 11 are labeled with the same reference numbers in FIG. 16, and a description of the construction of such elements is omitted here.

Here, in regard to the correspondence between the invention shown in FIG. 4 and the third illustrative implementation of the invention shown in FIG. 16, the medium playback means 1 corresponds to the disk drive part 33, the time period discriminating means 2 corresponds to the brightness difference detection part 40c and backlighting discriminating part 45c, and the playback display means 3 corresponds to the image expansion part 37, display memory 38, liquid crystal driving circuit 41 and of the micro-processor 35.

The operation of the third illustrative implementation of the invention will be described with reference to FIGS. 16 and 17.

First, when the main power supply of the image playback device 31 is switched on, the micro-processor 35 enters a waiting state until the playback button 46 is switched on.

When the playback button 46 is switched on (FIG. 17 S1) in this state, the micro-processor 35 instructs the disk drive part 33 to read out image files. The disk drive part 33 reads out image files from the optical-magnetic recording medium 32, and successively stores these image files in the memory 36 (FIG. 17 S2).

Figure 17:
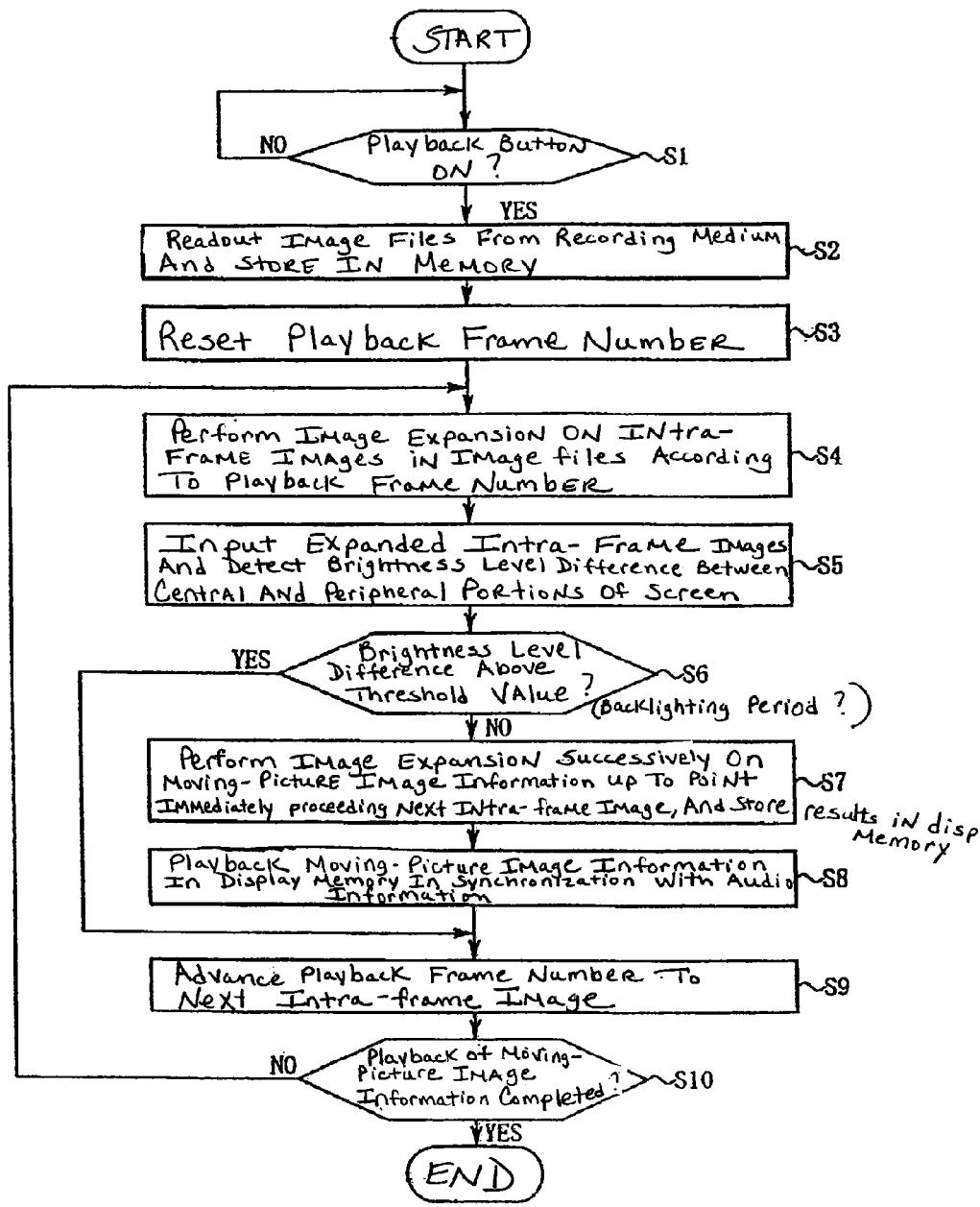
FIG. 17 is a flow chart illustrating the operation of the third illustrative implementation of the invention.

Meanwhile, the micro-processor 35 resets the playback frame numbers of the image files stored at prescribed addresses in the memory 36 (FIG. 17 S3).

Here, the micro-processor 35 instructs the image expansion part 37 to perform image expansion of intra-frame images. The image expansion part 37 inputs intra-frame images indicated by the playback frame numbers from image files in the memory 36, and performs image expansion on these intra-frame images (FIG. 17 S4).

The brightness difference detection part 40c inputs the intra-frame images following image expansion, and detects differences in the brightness level between central and peripheral portions of the image screen (FIG. 17 S5).

The backlighting discriminating part 45c ascertains whether or not such brightness level differences exceed a predetermined threshold value (FIG. 17 S6).

Here, in cases where the brightness level differences are less than the above-mentioned threshold value (No side of FIG. 17 S6), the micro-processor 35 instructs the image expansion part 37 to perform image expansion up to the point immediately preceding the next intra-frame image. The image expansion part 37 successively performs image expansion up to the next intra-frame image, and stores the resulting image information in the display memory 38 (FIG. 17 S7).

The liquid crystal driving circuit 41 reads out the moving-picture image information in the display memory 38 at the rate of every other frame period, and displays this information on the liquid crystal display part 42 (FIG. 17 SB). In this case, audio information which is synchronized with the moving-picture image information is played back together with the moving-picture image information by means of the audio D/A conversion part 39 and audio amplifier 43.

When image expansion up to the point immediately preceding the next intra-frame image is completed in the image expansion part 37, the micro-processor 35 advances the playback frame number to the frame number of the next intra-frame image (FIG. 17 S9).

In cases where the above-mentioned brightness level differences exceed the threshold value (YES side of FIG. 17 S6), the playback and display processing (FIG. 17 S7 and S8) is not performed. AB a result, in FIG. 17 S9, only the playback frame number is advanced to the frame number of the next intra-frame image.

In cases where the playback of moving-picture image information is not completed following the above series of operations (NO side of FIG. 17 S10), the operation returns to the processing of FIG. 17 S4, and the above operations are repeated.

On the other hand, when the playback of moving-picture image information is completed to the last frame number (YES side of FIG. 17 S10), the image file playback operation is completed. Furthermore, at this time, the temporary recording of intra-frame images is also erased.

As a result of the above operation, image files are played back and displayed with backlighting periods (in which the brightness level difference exceeds the above-mentioned threshold value) omitted. Accordingly, the operator can view moving-picture image information with faulty imaging portions caused by backlighting omitted.

Figure 18:
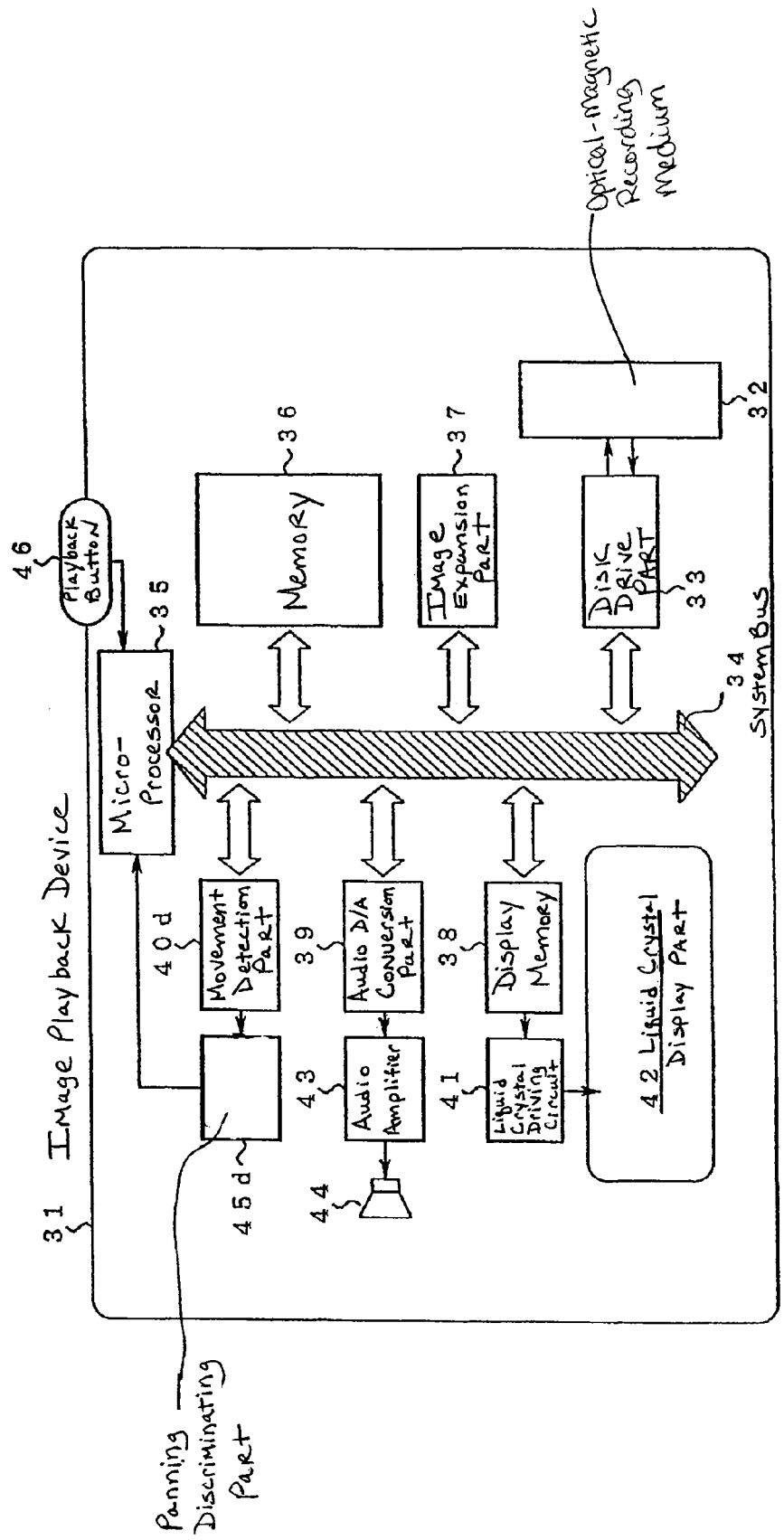
FIG. 18 is a block diagram of a fourth illustrative implementation of the invention.

FIG. 18 is a block diagram of a fourth illustrative implementation of the invention (corresponding to FIG. 5).

In structural terms, this fourth illustrative implementation of the invention is characterized by the fact that a movement detection part 40d and a panning discriminating part 45d are respectively installed instead of the sound quantity detection part 40a and silence discriminating part 45a shown in FIG. 11.

Furthermore, constituent elements which are the same as constituent elements shown in FIG. 11 are labeled with the same reference numbers in FIG. 18, and a description of the construction of such elements is omitted here.

Here, in regard to the correspondence between the invention shown in FIG. 5 and the fourth illustrative implementation of the invention shown in FIG. 18, the medium playback means 1 corresponds to the disk drive part 33, the time period discriminating means 2 corresponds to the movement detection part 40d and panning discriminating part 45d, and the playback display means 3 corresponds to the image expansion part 37, display memory 38, liquid crystal driving circuit 41 and of the micro-processor 35.

The operation of the fourth illustrative implementation of the invention will be described with reference to FIGS. 18 and 19.

First, when the main power supply of the image playback device 31 is switched on, the micro-processor 35 enters a waiting state until the playback button 46 is switched on.

When the playback button 46 is switched on (FIG. 19 S1) in this state, the micro-processor 35 instructs the disk drive part 33 to read out image files. The disk drive part 33 reads out image files from the optical-magnetic recording medium 32, and successively stores these image files in the memory 36 (FIG. 19 S2).

Figure 19:
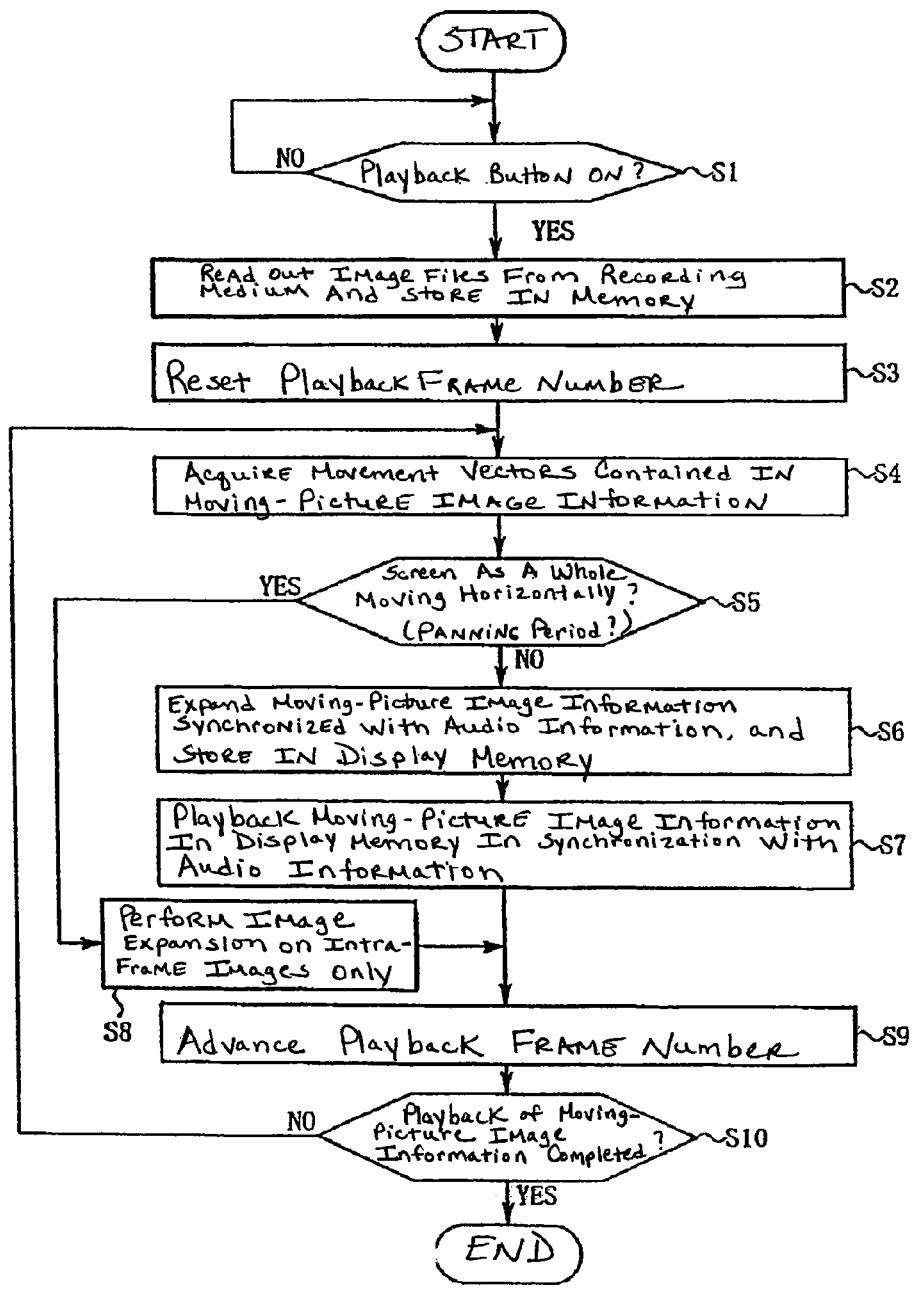
FIG. 19 is a flow chart illustrating the operation of the fourth illustrative implementation of the invention.

Meanwhile, the micro-processor 35 resets the playback frame numbers of the image files stored at prescribed addresses in the memory 36 (FIG. 19 S3).

The movement detection part 40d acquires universally known movement vectors from the moving-picture image information indicated by the playback frame numbers (FIG. 19 S4). These movement vectors consist of vector information which digitizes the movement in images between frames when inter-frame compression of the moving-picture image information is performed. Since these movement vectors are also used for image expansion during playback, the vectors are assigned to moving-picture image information following compression, and are recorded.

The panning discriminating part 45*d* ascertains from the above-mentioned movement vectors whether or not the screen as a whole is in the process of parallel movement (FIG. 19 S5).

Here, in cases where the screen as a whole is not undergoing parallel movement (NO side of FIG. 19 S5), the micro-processor 35 instructs the image expansion part 37 to perform image expansion. The image expansion part 37 inputs the moving-picture image information indicated by the playback frame numbers from the image files, performs image expansion, and stores the resulting image information in the display memory 38 (FIG. 19 S6).

The liquid crystal driving circuit 41 reads out the moving-picture image information in the display memory 38 at the rate of every other frame period, and displays this information on the liquid crystal display part 42 (FIG. 19 S7). In this case, audio information which is synchronized with the moving-picture image information is played back together with the moving-picture image information by means of the audio D/A conversion part 39 and audio amplifier 43.

In cases where the screen as a whole is in the process of horizontal movement (YES side of FIG. 19 S5), the image expansion part 37 expands only the intra-frame images, and the resulting image information is temporarily stored in a working memory contained in the image expansion part 37 (FIG. 19 S8). These intra-frame images are used for image expansion of the preceding and following frames, and are not played back and displayed.

After such processing (FIG. 19 S7 or S8) has been completed, the micro-processor 35 advances the playback frame number by one step (FIG. 19 S19).

Here, in cases where the playback of the moving-picture image information has not been completed (NO side of FIG. 19 S10), the operation returns to the processing of FIG. 19 S4, and the operations described above are repeated.

On the other hand, when the playback of moving-picture image information is completed with frame number reaching the last number (YES side of FIG. 19 S10), the image file playback operation is completed. Furthermore, at this time, the temporary recording of intra-frame images is also erased.

As a result of the above operation, image files are played back and displayed with panning periods omitted. Accordingly, the operator can view moving-picture image information with panning portions (inserted incidentally for the purpose of connecting scenes) omitted.

Figure 20:
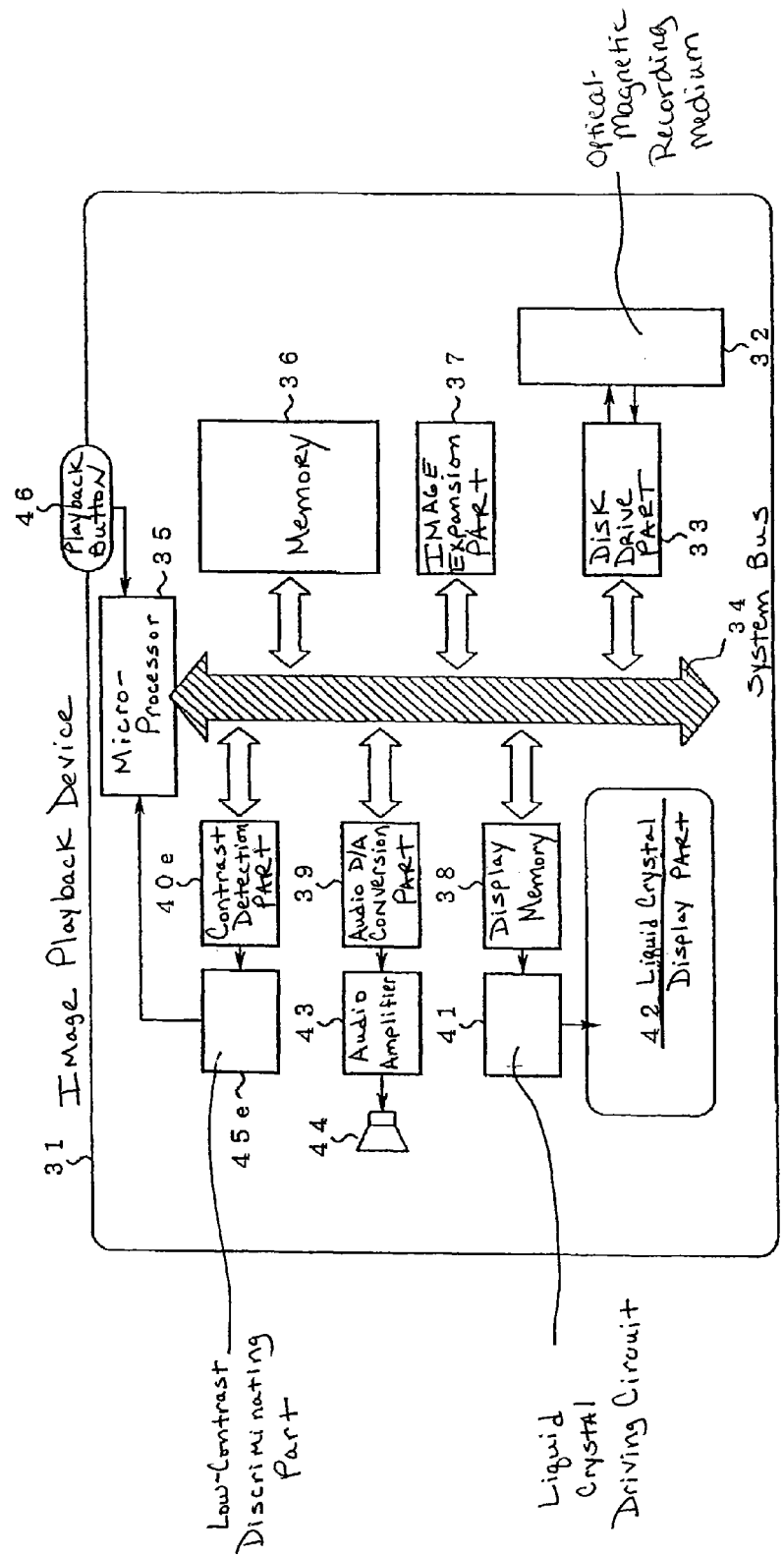
FIG. 20 is a block diagram of a fifth illustrative implementation of the invention.

FIG. 20 is a functional block diagram of a fifth illustrative implementation of the invention (corresponding to FIG. 6).

In structural terms, this fifth illustrative implementation of the invention is characterized by the fact that a contrast detection part 40*e* and a low-contrast discriminating part 45*e* are respectively installed instead of the sound quantity detection part 40*a* and silence discriminating part 45*a* shown in FIG. 11.

Furthermore, constituent elements which are the same as constituent elements shown in FIG. 11 are labeled with the same reference numbers in FIG. 20, and a description of the construction of such elements is omitted here.

Here, in regard to the correspondence between the invention shown in FIG. 6 and the fifth illustrative implementation of the invention shown in FIG. 20, the medium playback means 1 corresponds to the disk drive part 33, the time period discriminating means 2 corresponds to the contrast detection part 40*e* and low-contrast discriminating part 45*e*, and the playback display means 3 corresponds to the image expansion part 37, display memory 38, liquid crystal driving circuit 41 and the micro-processor 35.

The operation of the fifth illustrative implementation of the invention will be described with reference to FIGS. 20 and 21.

First, when the main power supply of the image playback device 31 is switched on, the micro-processor 35 enters a waiting state until the playback button 46 is switched on.

When the playback button 46 is switched on (FIG. 21 S1) in this state, the micro-processor 35 instructs the disk drive part 33 to read out image files.

Figure 21:
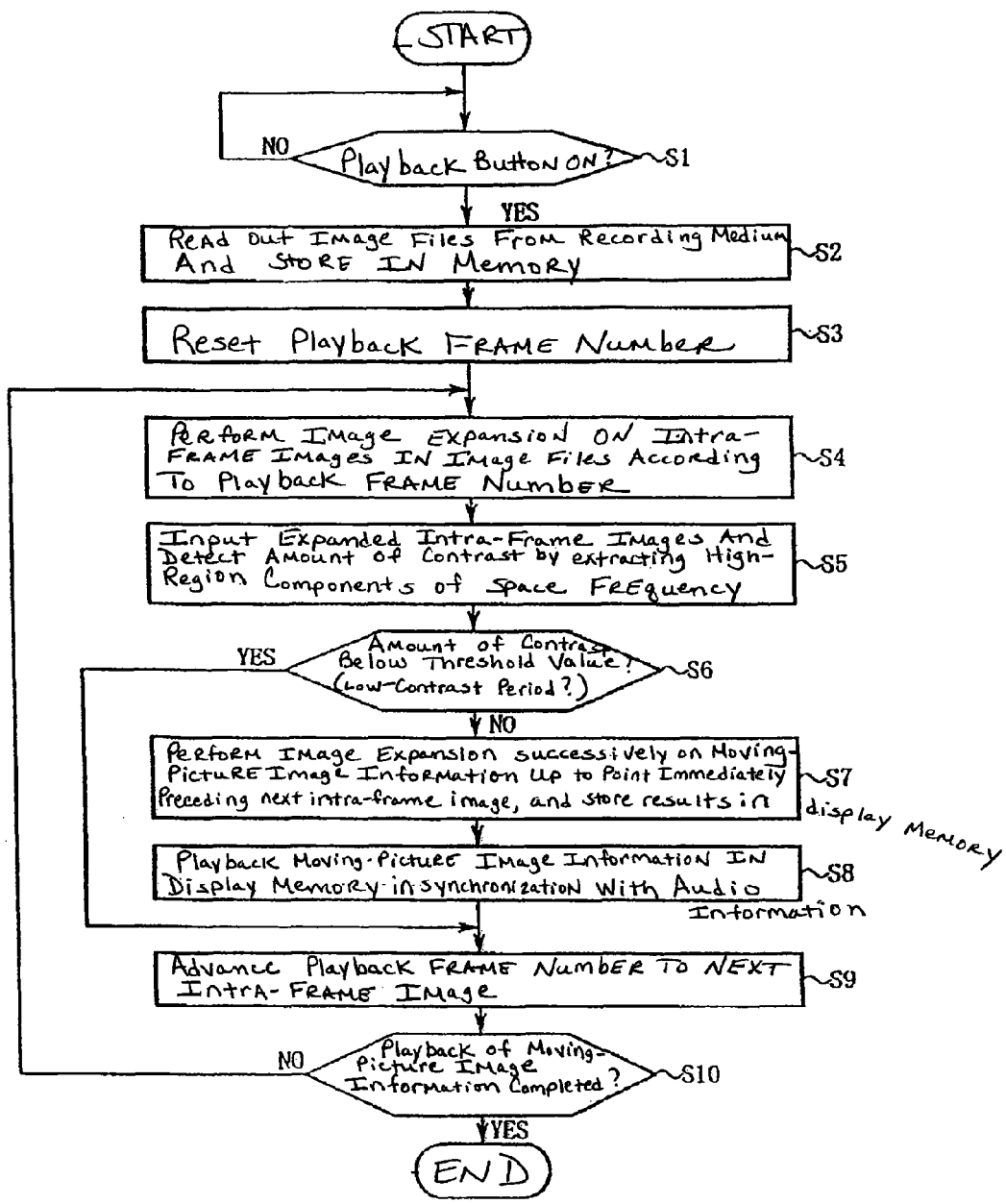
FIG. 21 is a flow chart illustrating the operation of the fifth illustrative implementation of the invention.

The disk drive part 33 reads out image files from the optical-magnetic recording medium 32, and successively stores these image files in the memory 36 (FIG. 21 S2).

Meanwhile, the micro-processor 35 resets the playback frame numbers of the image files stored at prescribed addresses in the memory 36 (FIG. 21 S3).

Here, the micro-processor 35 instructs the image expansion part 37 to perform image expansion on intra-frame images. The image expansion part 37 inputs the intra-frame images indicated by the playback frame numbers from the image files, and performs image expansion on these intra-frame images (FIG. 21 S4).

The contrast detection part 40*e* inputs intra-frame images following image expansion, extracts the high-region components of the space frequency, and detects the amount of contrast (FIG. 21 S5).

The low-contrast discriminating part 45*e* ascertains whether or not this amount of contrast is less than a predetermined threshold value (FIG. 21 S6).

Here, in cases where the amount of contrast exceeds the above-mentioned threshold value (NO side of FIG. 21 S6), the micro-processor 35 instructs the image expansion part 37 to perform image expansion up to the point immediately preceding the next intra-frame image. The image expansion part 37 successively performs image expansion up to the next intra-frame image, and stores the resulting image information in the display memory 38 (FIG. 21 S7).

The liquid crystal driving circuit 41 reads out the moving-picture image information in the display memory 38 at the rate of every other frame period, and displays this information on the liquid crystal display part 42 (FIG. 21 SB). In this case, audio information which is synchronized with the moving-picture image information is played back together with the moving-picture image information by means of the audio D/A conversion part 39 and audio amplifier 43.

When image expansion up to the point immediately preceding the next intra-frame image is completed in the image expansion part 37, the micro-processor 35 advances the playback frame number to the frame number of the next intra-frame image (FIG. 21 S9).

In cases where the above-mentioned amount of contrast is less than the threshold value (YES side of FIG. 21 S6), the playback and display processing (FIG. 21 S7 and S8) is not performed. As a result, in FIG. 21 S9, only the playback frame number is advanced to the frame number of the next intra-frame image.

In cases where the playback of moving-picture image information is not completed after the above series of operations has been completed (NO side of FIG. 21 S10), the operation returns to the processing of FIG. 21 S4, and the above operations are repeated.

On the other hand, when the playback of moving-picture image information is completed with frame number reaching the last number (YES side of FIG. 21 S10), the image file playback operation is completed. Furthermore, at this time, the temporary recording of intra-frame images is also erased.

As a result of the above operation, image files are played back and displayed with low-contrast periods (in which the amount of contrast is less than the above-mentioned threshold value) omitted. Accordingly, the operator can view moving-picture image information with scenes of walls, etc. (in which the main objects are not imaged) omitted.

Figure 22:
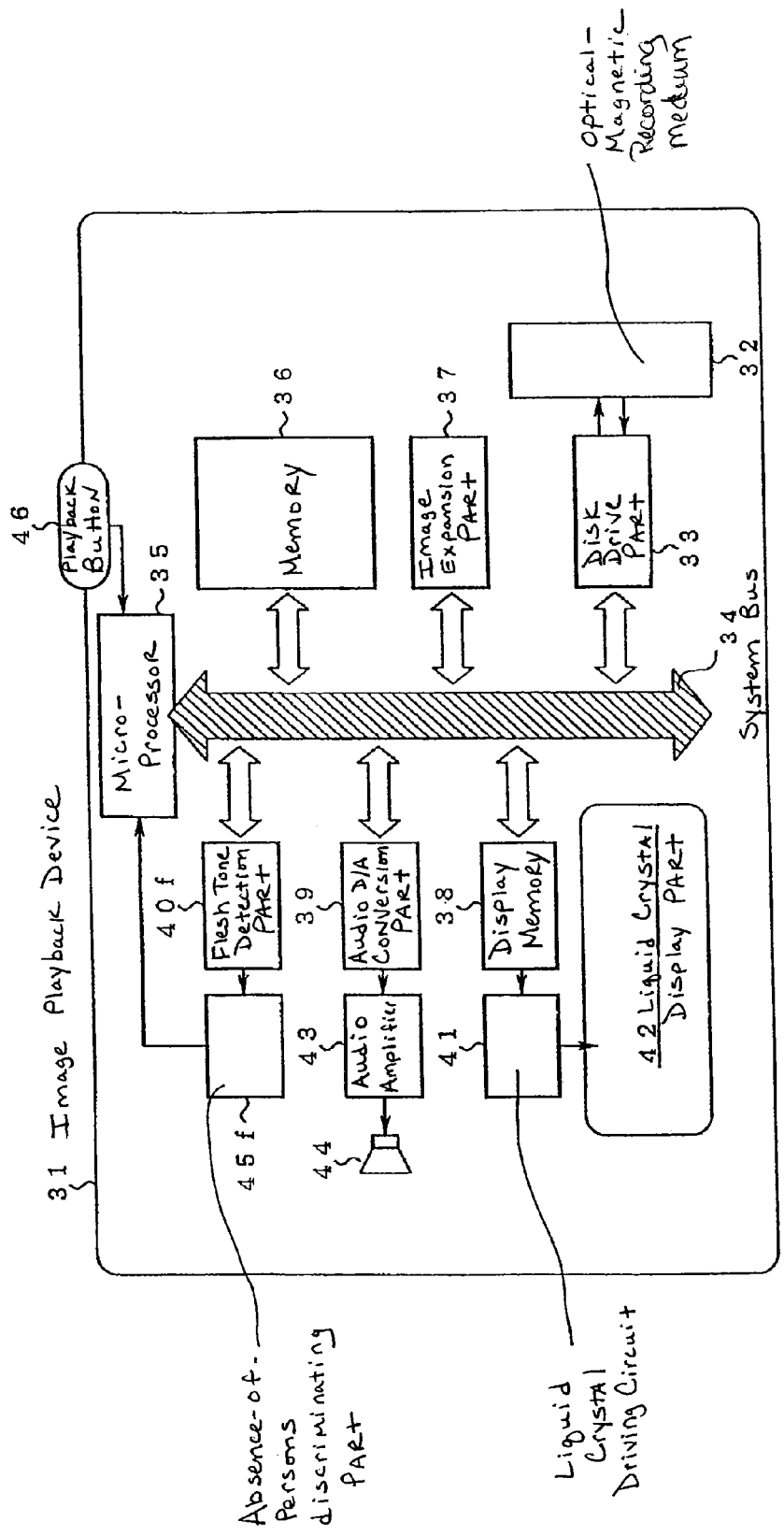
FIG. 22 is a block diagram of a sixth illustrative implementation of the invention.

FIG. 22 is a functional block diagram of a sixth illustrative implementation of the invention (corresponding to FIG. 7).

In structural terms, this sixth illustrative implementation of the invention is characterized by the fact that a flesh tone detection part 40f and an absence-of-persons discriminating part 45f are respectively installed instead of the sound quantity detection part 40a and silence discriminating part 45a shown in FIG. 11.

Furthermore, constituent elements which are the same as constituent elements shown in FIG. 11 are labeled with the same reference numbers in FIG. 22, and a description of the construction of such elements is omitted here.

Here, in regard to the correspondence between the invention shown in FIG. 7 and the sixth illustrative implementation of the invention shown in FIG. 22, the medium playback means 1 corresponds to the disk drive part 33, the time period discriminating means 2 corresponds to the flesh tone detection part 40f and absence-of-persons discriminating part 45f, and the playback display means 3 corresponds to the image expansion part 37, display memory 38, liquid crystal driving circuit 41 and the micro-processor 35.

The operation of the sixth illustrative implementation of the invention will be described with reference to FIGS. 22 and 23.

First, when the main power supply of the image playback device 31 is switched on, the micro-processor 35 enters a waiting state until the playback button 46 is switched on.

When the playback button 46 is switched on (FIG. 23 S1) in this state, the micro-processor 35 instructs the disk drive part 33 to read out image files.

Figure 23:
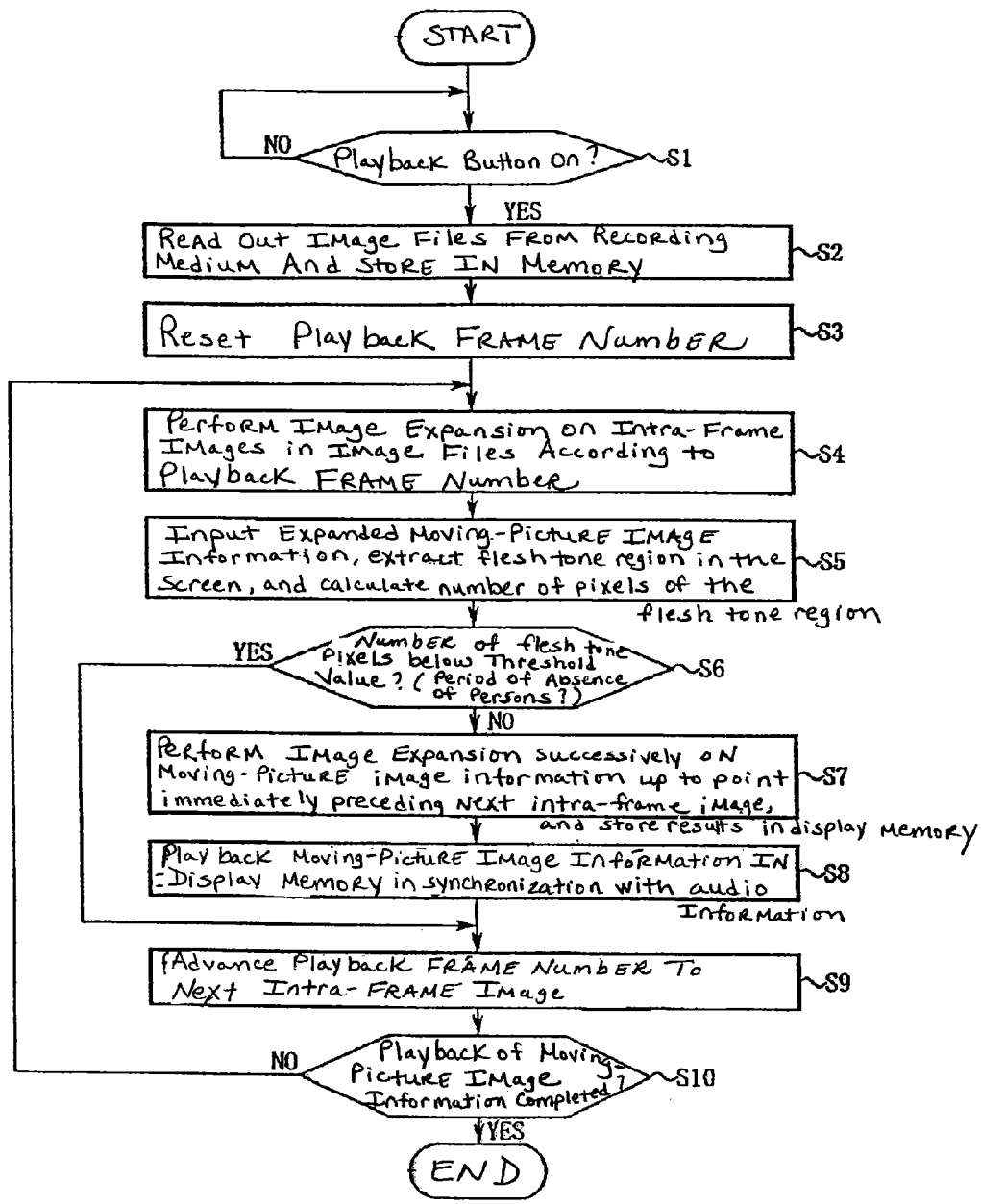
FIG. 23 is a flow chart illustrating the operation of the sixth illustrative implementation of the invention.

The disk drive part 33 reads out image files from the optical-magnetic recording medium 32, and successively stores these image files in the memory 36 (FIG. 23 S2).

Meanwhile, the micro-processor 35 resets the playback frame numbers of the image files stored at prescribed addresses in the memory 36 (FIG. 23 S3).

Here, the micro-processor 35 instructs the image expansion part 37 to perform image expansion on intra-frame images. The image expansion part 37 inputs the intra-frame images indicated by the playback frame numbers from the image files in the memory 36, and performs image expansion on these intra-frame images (FIG. 23 S4).

The flesh tone detection part 40f inputs intra-frame images following image expansion, extracts image regions which resemble flesh tones (flesh tone regions), and counts the number of pixels in such flesh tone regions (FIG. 23 S5).

The absence-of-persons discriminating part 45f ascertains whether or not the number of pixels of the above-mentioned flesh tone regions is less than a predetermined threshold value (FIG. 23 S6).

Here, in cases where the number of pixels of the above-mentioned flesh tone regions exceeds the above-mentioned threshold value (NO side of FIG. 23 S6), the micro-processor 35 instructs the image expansion part 37 to perform image expansion up to the point immediately preceding the next intra-frame image. The image expansion part 37 successively performs image expansion up to the next intra-frame image, and stores the resulting image information in the display memory 38 (FIG. 23 S7).

The liquid crystal driving circuit 41 reads out the moving-picture image information in the display memory 38 at the rate of every other frame period, and displays this information on the liquid crystal display part 42 (FIG. 23 S8). In this case, audio information which is synchronized with the moving-picture image information is played back together with the moving-picture image information by means of the audio D/A conversion part 39 and audio amplifier 43.

When image expansion up to the point immediately preceding the next intra-frame image is completed in the image expansion part 37, the micro-processor 35 advances the playback frame number to the frame number of the next intra-frame image (FIG. 23 S9).

In cases where the number of pixels of the flesh tone regions is less than the above-mentioned threshold value (YES side of FIG. 23 S6), the playback and display processing (FIG. 23 S7 and S8) is not performed. As a result, in FIG. 23 S9, only the playback frame number is advanced to the frame number of the next intra-frame image.

In cases where the playback of moving-picture image information is not completed after the above series of operations has been completed (NO side of FIG. 23 S10), the operation returns to the processing of FIG. 23 S4, and the above operations are repeated.

On the other hand, when the playback of moving-picture image information is completed with the frame number reaching the last number (YES side of FIG. 23 S10), the image file playback operation is completed. Furthermore, at this time, the temporary recording of intra-frame images is also erased.

As a result of the above operation, image files are played back and displayed with periods of absence of persons (in which the flesh tone regions have less than a prescribed area) omitted.

Accordingly, the operator can view moving-picture image information with an emphasis on scenes in which persons are imaged.

Figure 24:
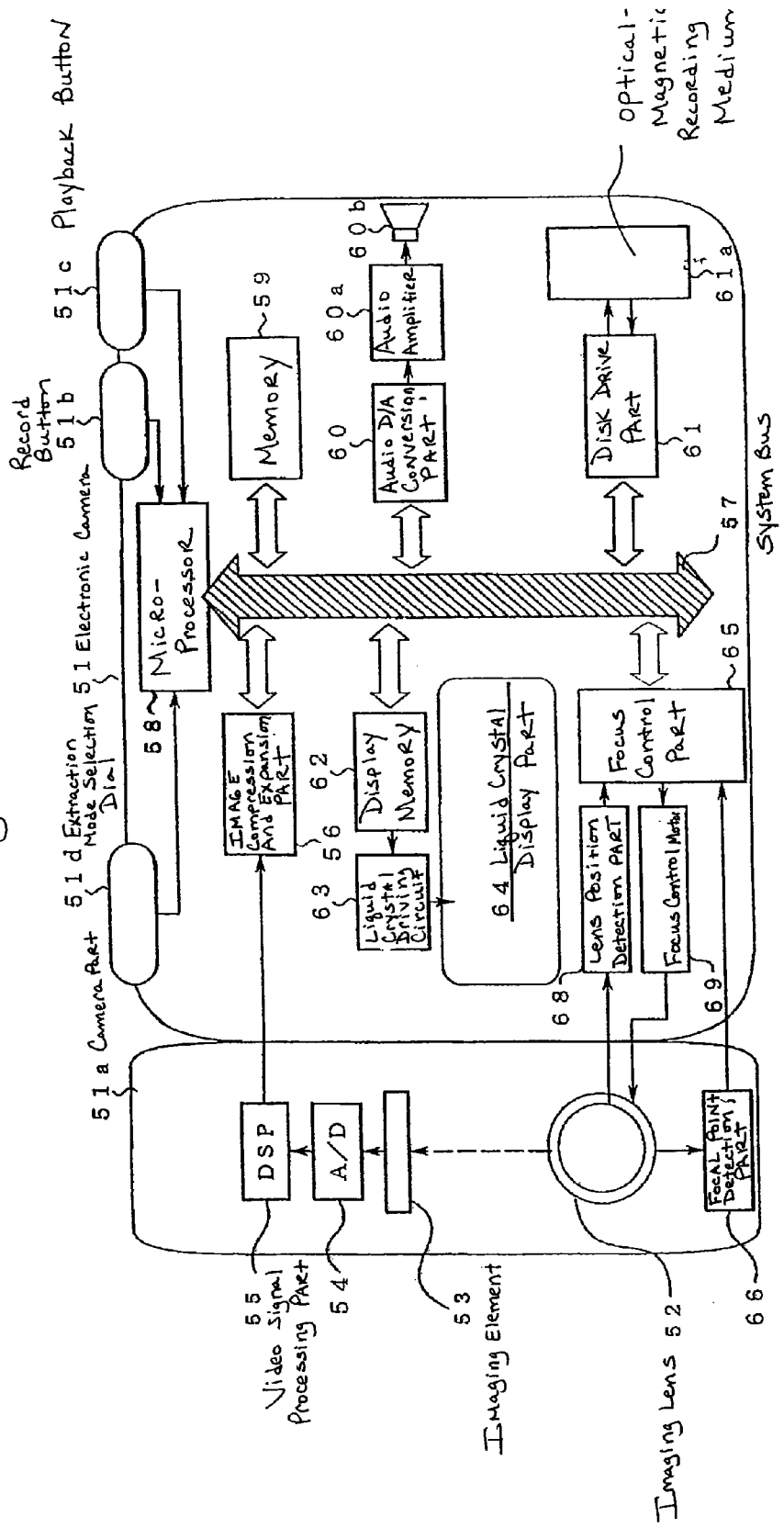
FIG. 24 is a block diagram of a seventh illustrative implementation of the invention.

FIG. 24 is a block diagram of a seventh illustrative implementation of the invention (corresponding to FIG. 8).

In FIG. 24, a camera part 51a is attached to the side surface of the main body of an electronic camera 51, and an imaging lens 52 which focuses an image of the object of imaging is mounted in this camera part 51a.

The optical axis of the imaging lens 52 is bent within the camera part 51a, and the light-receiving surface of an imaging element 53 consisting of a CCD image sensor, etc., is installed on an extension of this optical axis.

The photoelectric output of the imaging element 53 is input via an A/D conversion part 54 into a video signal processing part 55 which performs a white balance adjustment and gamma correction, etc.

The output of the video signal processing part 55 is input into an image compression and expansion part 56 located within the main body; this image compression and expansion part 56 is connected with a micro-processor 58 via a system bus 57.

A memory 59, an audio D/A conversion part 60, a disk drive part 61, a display memory 62 and a focus control part 65 are connected to the above-mentioned system bus 57.

The output of the above-mentioned audio D/A conversion part 60 is input into a speaker 60b via an audio amplifier 60a.

Furthermore, an optical-magnetic recording medium 61a is mounted in a freely detachable manner in the disk drive part 61.

The display memory 62 is connected to a liquid crystal display part 64 via a liquid crystal driving circuit 63.

A focal point detection part 66 which detects the focal point adjustment conditions of the imaging lens 52, and a lens position detection part 68 which detects the lens position of the imaging lens 52, are connected to the input terminals of the focus control part 65. Furthermore, a focus control motor 69 which moves the imaging lens forward and backward is connected to the output terminal of the focus control part 65.

The focus control part 65 controls the focus by driving the focus control motor 69 in accordance with the amount of defocusing acquired from the focal point detection part 66.

A record button 51b, a playback button 51c and an extraction mode selection dial 51d are installed in the housing of the electronic camera 51, and the outputs of these operating parts are respectively input into the micro-processor 58.

Furthermore, in regard to the correspondence between the invention shown in FIG. 8 and the seventh illustrative implementation of the invention shown in FIG. 24, the imaging means 16 corresponds to the imaging element 53, the imaging parameter detection means 17 corresponds to the focal point detection part 66 and lens position detection part 68, the medium recording means 18 corresponds to the disk drive part 61, the time period discriminating means 19 corresponds to the micro-processor 58, the medium playback means 1 corresponds to the disk drive part 61, and the playback display means 3 corresponds to the image compression and expansion part 56, display memory 62, liquid crystal driving circuit 63 and the micro-processor 58.

The operation of the seventh illustrative implementation of the invention will be described with reference to FIGS. 24 through 26.

(Image Recording Operation)

First, when the main power supply is switched on, the electronic camera 51 enters a waiting state until the playback button 51c or record button 51b is switched on.

When the playback button 51c is switched on (FIG. 25 S1) in this state, the micro-processor 58 performs the operation indicated in FIG. 26 S9 (which will be described later).

When the record button 51b is switched on (FIG. 25 S2), the micro-processor 58 instructs the image compression and expansion part 56 to begin image compression. The image compression and expansion part 56 inputs moving-picture image information from the video signal processing part 55, and performs image compression processing according to the MPEG standard (FIG. 25 S3).

Figure 25:
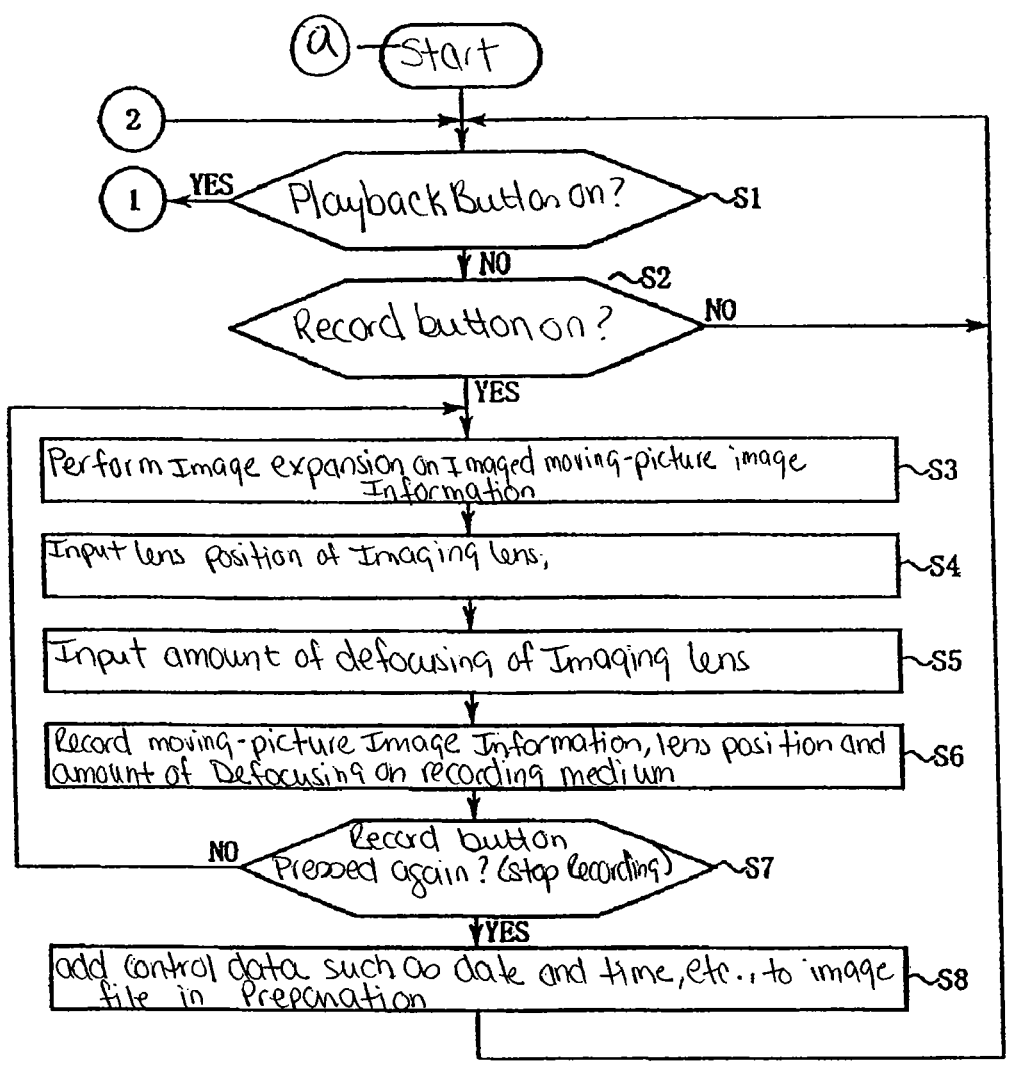
FIGS. 25 and 26 are flow charts illustrating the operation of the seventh illustrative implementation of the invention.

In parallel with such image compression, the micro-processor 58 inputs the lens position and amount of defocusing of the imaging lens 52 via the focus control part 65 (FIG. 25 S4 and S5).

The disk drive part 61 records the above-mentioned moving-picture image information, lens position and amount of defocusing together in image files on the optical-magnetic recording medium 61a (FIG. 25 S6).

In this state, the micro-processor 58 returns to FIG. 25 S3, and the above-mentioned recording operation is repeated (NO side of FIG. 25 S7) until the record button 51b is pressed again.

When the record button 51b is pressed again (YES side of FIG. 25 S7), the micro-processor 58 returns to FIG. 25 S1 after performing final processing such as the addition of control data (e.g., date and time data, etc.) to the image file in preparation (FIG. 25 S8), so that the recording operation is completed.

(Playback Operation)

When the playback button 51c is switched on (FIG. 25 S1) in the above-mentioned waiting state, the micro-processor 58 instructs the disk drive part 61 to read out image files. The disk drive part 61 reads out image files from the optical-magnetic recording medium 61a, and successively stores these files in the memory 59 (FIG. 26 S9).

Figure 26:
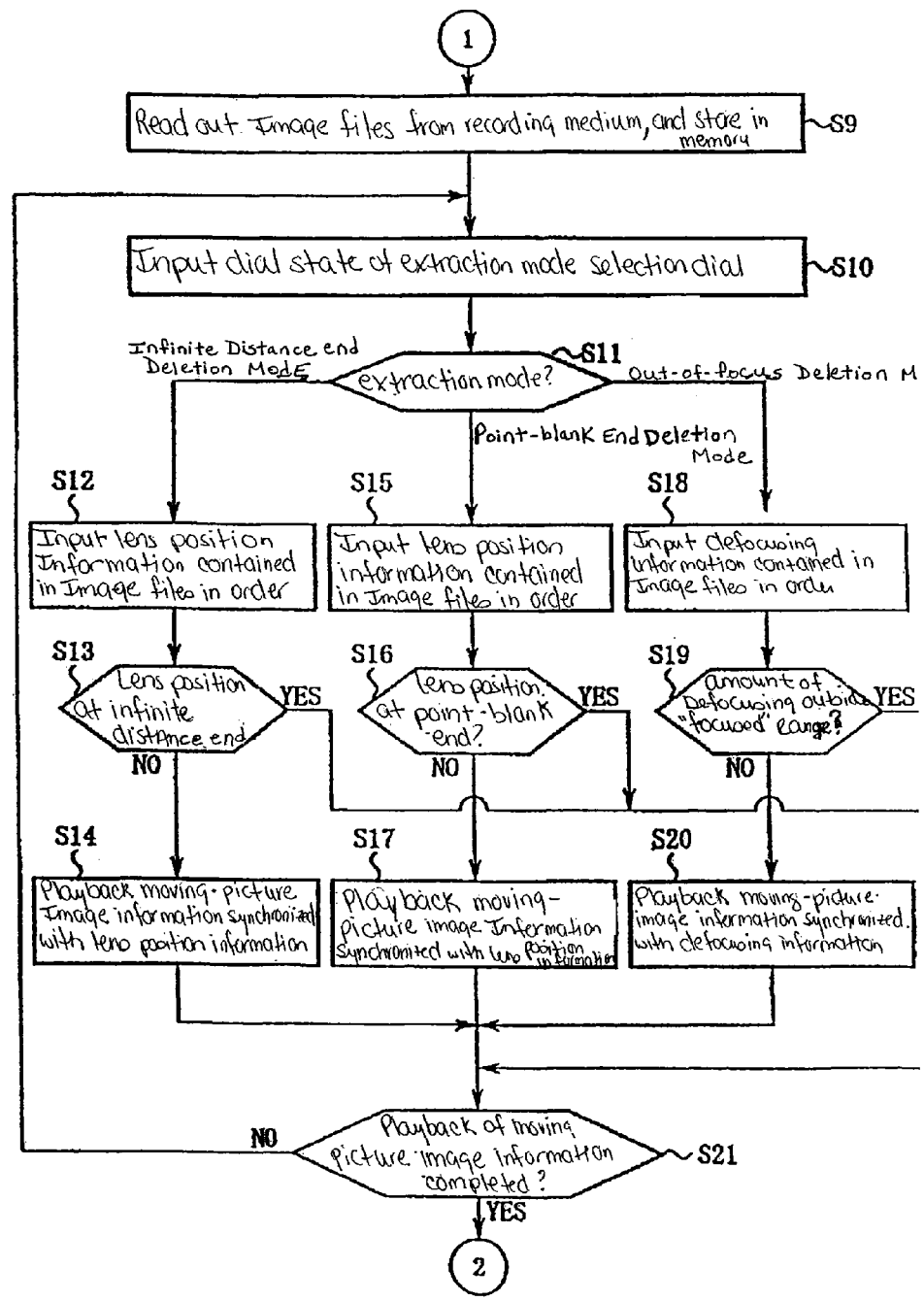

Next, the micro-processor 58 inputs the dial state of the extraction mode selection dial 51d (FIG. 26 S10), and performs the following operations in accordance with this dial state (FIG. 26 S11).

First, in cases where the dial state is "infinitely distant end deletion mode", the micro-processor 58 inputs the lens position information from the image files in the memory 59 in playback order (FIG. 26 S12). Here, moving-picture image information which is synchronized with the lens position information is played back and displayed (FIG. 26 S14) only in cases where the lens position is not at the infinitely distant end (FIG. 26 S13).

Furthermore, in cases where the dial state is "point-blank end deletion mode", the micro-processor 58 inputs the lens position information from the image files in the memory 59 in playback order (FIG. 26 S15). Here, moving-picture image information which is synchronized with the lens position information is played back and displayed (FIG. 26 S17) only in cases where the lens position is not at the point-blank end (FIG. 26 S16).

Moreover, in cases where the dial state is "out-of-focus deletion mode", the micro-processor 58 inputs information indicating the amount of defocusing from the image files in the memory 59 in playback order (FIG. 26 S18). Here, moving-picture image information which is synchronized with the lens position information is played back and displayed (FIG. 26 S20) only in cases where the amount of defocusing is within the "focused" range (FIG. 26 S19).

In cases where the playback of moving-picture image information is not completed after the above series of operations has been completed (NO side of FIG. 26 S21), the operation returns to the processing of FIG. 26 S10, and the above operations are repeated.

On the other hand, when the playback of moving-picture image information is completed (YES side of FIG. 26 S21), the image file playback operation is completed.

As a result of the above operations, image files are selectively played back and displayed in accordance with the conditions of the imaging lens 52 at the time of imaging. Accordingly, the operator can appropriately extract and view playback scenes in accordance with the conditions of the imaging lens 52.

Figure 27:
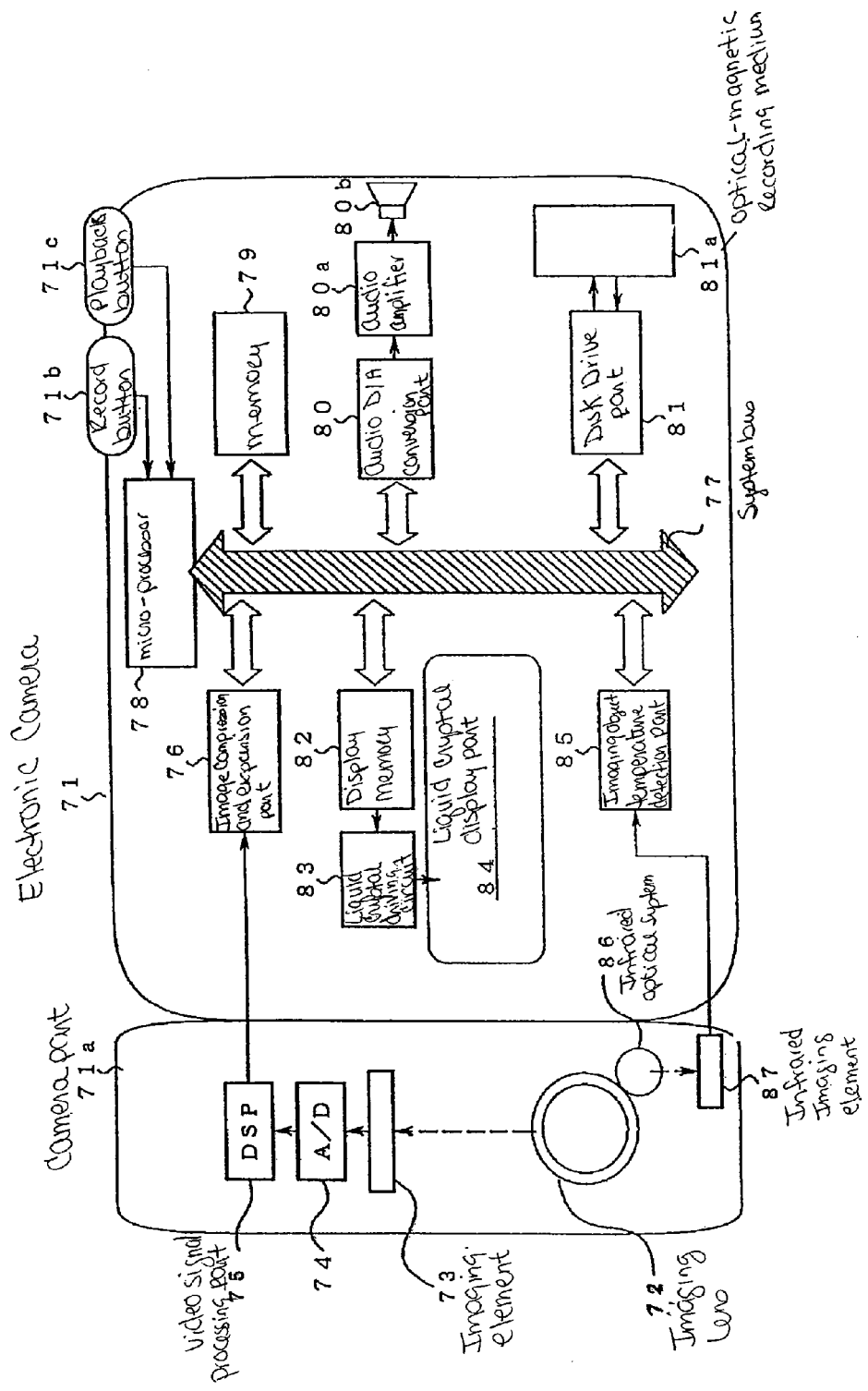
FIG. 27 is a block diagram of an eighth illustrative implementation of the invention.

FIG. 27 is a block diagram of a seventh illustrative implementation of the invention (corresponding to FIGS. 9 and 10).

In FIG. 27, a camera part 71a is attached to the side surface of the main body of an electronic camera 71, and an imaging lens 72 which focuses an image of the object is mounted in this camera part 71a.

The optical axis of the imaging lens 72 is bent within the camera part 71a, and the light-receiving surface of an imaging element 73 consisting of a CCD image sensor, etc., is installed on an extension of this optical axis.

The photoelectric output of the imaging element 73 is input via an A/D conversion part 74 into a video signal processing part 75 which performs a white balance adjustment and gamma correction, etc.

The output of the video signal processing part 75 is input into an image compression and expansion part 76 located within the main body; this image compression and expansion part 76 is connected with a micro-processor 78 via a system bus 77.

A memory 79, an audio D/A conversion part 80, a disk drive part 81, a display memory 82 and an imaging object temperature detection part 85 are connected to the above-mentioned system bus 77.

The output of the above-mentioned audio D/A conversion part 80 is input into a speaker 80b via an audio amplifier 80a.

Furthermore, an optical-magnetic recording medium 81*a* is mounted in a freely detachable manner in the disk drive part 81.

The display memory 82 is connected to a liquid crystal display part 84 via a liquid crystal driving circuit 83.

An infrared imaging element 87 equipped with an infrared optical system 86 is connected to the input terminal of the imaging object temperature detection part 85. Furthermore, an infrared imaging element of the thermal type or quantum type, etc., is used as the above-mentioned infrared imaging element 87.

A record button 71*b* and a playback button 71*c* are installed in the housing of the electronic camera 71, and the outputs of these operating parts are input into the micro-processor 78.

Furthermore, in regard to the correspondence between the inventions shown in FIGS. 9 and 10 and the eighth illustrative implementation shown in FIG. 27, the imaging means 16 corresponds to the imaging element 73, the environmental parameter detection means 20 corresponds to the infrared optical system 86, infrared imaging element 87 and imaging object temperature detection part 85, the medium recording means 18 corresponds to the disk drive part 81, the time period discriminating means 21 corresponds to the micro-processor 78, the medium playback means 1 corresponds to the disk drive part 81, and the playback display means 3 corresponds to the image compression and expansion part 76, display memory 82, liquid crystal driving circuit 83 and the micro-processor 78.

The operation of the eighth illustrative implementation of the invention will be described with reference to FIGS. 27 and 28.

(Image Recording Operation)

First, when the main power supply is switched on, the electronic camera 71 enters a waiting state until the playback button 71*c* or record button 71*b* is switched on.

When the playback button 71*c* is switched on (FIG. 28 S1) in this state, the micro-processor 78 performs the operation indicated in FIG. 26 S8 (which will be described later).

When the record button 71*b* is switched on (FIG. 28 S2), the micro-processor 78 instructs the image compression and expansion part 76 to begin image compression. The image compression and expansion part 76 inputs moving-picture image information from the video signal processing part 75, and performs image compression processing according to the MPEG standard (FIG. 28 S3).

In parallel with such image compression, the micro-processor 78 instructs the imaging object temperature detection part 85 to detect the temperature of the object. The object temperature detection part 85 detects infrared radiation from the image field via the infrared imaging element 87, and determines the temperature of the object of (FIG. 28 S4).

Figure 28:
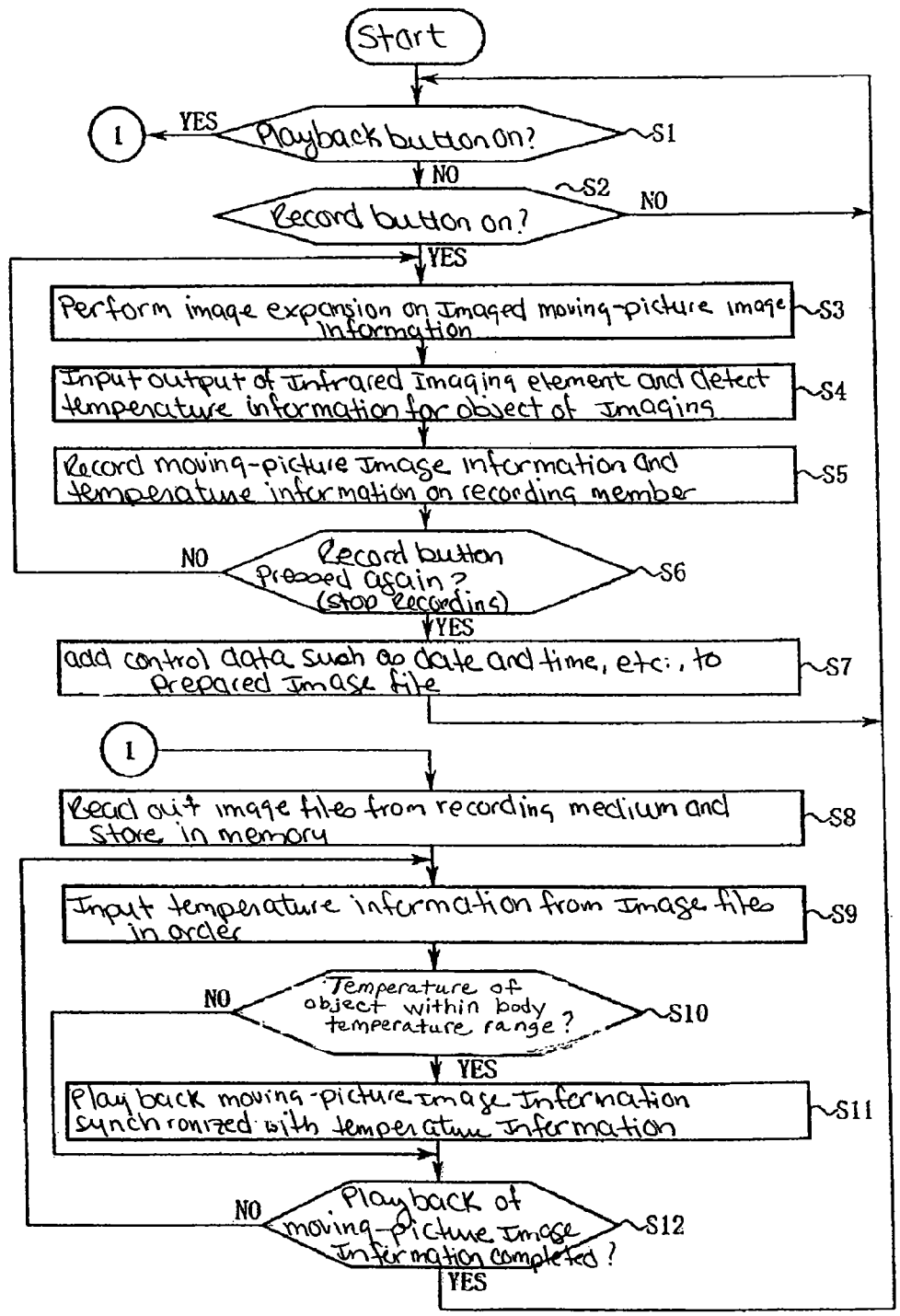
FIG. 28 is a flow chart illustrating the operation of the eighth illustrative implementation of the invention.

The disk drive part 81 records the above-mentioned moving-picture image information and object temperature together in image files on the optical-magnetic recording medium 81*a* (FIG. 28 S5).

In this state, the micro-processor 78 returns to FIG. 28 S3, and the above-mentioned recording operation is repeated (NO side of FIG. 28 S6) until the record button 71*b* is pressed again.

When the record button 71*b* is pressed again (YES side of FIG. 28 S6), the micro-processor 78 returns to FIG. 28 S1 after performing final processing such as the addition of control data (e.g., date and time data, etc.) to the image file in preparation (FIG. 28 S7), so that the recording operation is completed.

(Playback Operation)

When the playback button 71*c* is switched on (FIG. 28 S1) in the above-mentioned waiting state, the micro-processor 78 instructs the disk drive part 81 to read out image files. The disk drive part 81 reads out image files from the optical-magnetic recording medium 81*a*, and successively stores these files in the memory 79 (FIG. 28 S8).

Next, the micro-processor 78 inputs object temperature information from the image files in the memory 79 in playback order (FIG. 28 S9).

Here, the micro-processor 78 ascertains whether or not the temperature of the object is in the range of 30 to 40° C., which is the body temperature range of a human being (FIG. 28 S10).

In cases where the temperature of the object is in the above-mentioned body temperature range (YES side of FIG. 28 S10), the micro-processor 78 instructs the image compression and expansion part 76 to perform image expansion. The image compression and expansion part 76 inputs moving-picture image information synchronized with imaging object temperature information from the image files in the memory 79, performs image expansion on this moving-picture image information, and records the resulting image information in the display memory 82. The liquid crystal driving circuit 83 inputs the moving-picture image information from the display memory 82 in order, and displays this image information on the liquid crystal display part 84 (FIG. 28 S11).

In cases where the temperature of the object is outside the above-mentioned body temperature range (NO side of FIG. 28 S10), playback and display are not performed as described above.

In cases where the playback of moving-picture image information is not completed after the above series of operations has been completed (NO side of FIG. 28 S12), the operation returns to the processing of FIG. 28 S9, and the above operations are repeated.

On the other hand, when the playback of moving-picture image information is completed (YES side of FIG. 28 S12), the image file playback operation is completed.

As a result of the above operations, image files are selectively played back and displayed only in cases where the temperature of the object is in the human body temperature range. Accordingly, the operator can view moving-picture image information with an emphasis on scenes in which human beings are imaged.

In the illustrative implementation of the inventions described above, periods meeting certain conditions were discriminated, and image information was played back and displayed only during these periods. However, the present invention is not limited to such a construction; it would also be possible to perform such playback and display only during time periods other than the discriminated periods.

In the illustrative implementation of the inventions described above, only cases in which partial playback was performed automatically were described in order to simplify the description. However, the present invention is not limited to such a construction; for example, it would also be possible for the operator to determine whether or not partial playback is performed by operating a switch, etc.

In the illustrative implementation of the inventions other than the seventh illustrative implementation of the invention, periods were discriminated based on a single condition. However, the present invention is not limited to such a construction; for example, it would also be possible to install discriminating means for a plurality of conditions beforehand, with the operator selecting desired conditions by operating switches, etc. Also, it would also be possible to set prescribed logical operations (logical products, logical sums, etc.) for a plurality of conditions, and to discriminate periods based on composite conditions answering to these logical operations. For example, in a case where periods are discriminated based on the logical product of panning discrimination and absence-of-persons discrimination, moving-picture image information can be played back and displayed with an emphasis on "car window scenery with persons absent", etc. Furthermore, fuzzy logic, etc., can also be employed in such logical operations.

In the illustrative implementation of the inventions described above, an optical-magnetic recording medium was used as the recording medium; however, the present invention is not restricted in terms of the form or material of the recording medium used. For example, semiconductor recording media, magnetic recording media or optical recording media, etc., may also be used as recording media.

In the second illustrative implementation of the invention, long-term spectrum averages were used as audio characteristic feature parameters; however, the present invention is not limited to such a construction. Any waveform or value which indicates characteristic features of voices, e.g., mean pitch frequency, etc., may be used as a characteristic feature parameter.

While preferred embodiments and implementations of the invention have been shown and described, it will be apparent to those skilled in the art that changes can be made in these embodiments and implementations without departing from the principles and spirit of the invention, the scope of which is defined in the appended claims.

What is claimed is:

1. An electronic camera comprising:
an imaging means which produces moving-picture image information by imaging an object via an imaging optical system;
an imaging parameter detection means which detects at least one imaging parameter of the imaging optical system;
a medium recording means which receives the moving-picture image information produced by the imaging means and the at least one imaging parameter detected by the imaging parameter detection means, and records the moving-picture image information and the at least one imaging parameter on a recording medium as recorded information;
a medium playback means which reads out the recorded information from the recording medium;
a time period discriminating means which receives the at least one imaging parameter from the recorded information read out by the medium playback means, and discriminates time periods during which the received at least one imaging parameter agrees with at least one pre-set condition; and
a playback display means which plays back and displays the moving-picture image information contained in the recorded information in accordance with results of the discrimination performed by the time period discriminating means; wherein:
the imaging parameter detection means detects focal point adjustment conditions of the imaging optical system as the at least one imaging parameter;
the time period discriminating means receives the focal point adjustment conditions from the recorded information read out by the medium playback means, and discriminates out-of-focus periods in which the focal point adjustment conditions represent an out-of-focus state; and
the playback display means plays back and displays the moving-picture image information contained in the recorded information only during time periods other than the out-of-focus periods detected by the time period discriminating means.

2. An electronic camera comprising:
an imaging means which produces moving-picture image information by imaging an object via an imaging optical system;
an imaging parameter detection means which detects at least one imaging parameter of the imaging optical system;
a medium recording means which receives the moving-picture image information produced by the imaging means and the at least one imaging parameter detected by the imaging parameter detection means, and records the moving-picture image information and the at least one imaging parameter on a recording medium as recorded information;
a medium playback means which reads out the recorded information from the recording medium;
a time period discriminating means which receives the at least one imaging parameter from the recorded information read out by the medium playback means, and discriminates time periods during which the received at least one imaging parameter agrees with at least one pre-set condition; and
a playback display means which plays back and displays the moving-picture image information contained in the recorded information in accordance with results of the discrimination performed by the time period discriminating means; wherein:
the imaging parameter detection means detects a lens position of the imaging optical system as the at least one imaging parameter;
the time period discriminating means receives the lens position from the recorded information read out by the medium playback means, and discriminates point-blank periods in which the lens position is at a point-blank end; and
the playback display means plays back and displays the moving-picture image information contained in the recorded information only during time periods other than the point-blank periods discriminated by the time period discriminating means.

3. An electronic camera comprising:
an imaging means which produces moving-picture image information by imaging an object via an imaging optical system;
an imaging parameter detection means which detects at least one imaging parameter of the imaging optical system;
a medium recording means which receives the moving-picture image information produced by the imaging means and the at least one imaging parameter detected by the imaging parameter detection means, and records the moving-picture image information and the at least one imaging parameter on a recording medium as recorded information;
a medium playback means which reads out the recorded information from the recording medium;
a time period discriminating means which receives the at least one imaging parameter from the recorded information read out by the medium playback means, and discriminates time periods during which the received at least one imaging parameter agrees with at least one pre-set condition; and a playback display means which plays back and displays the moving-picture image information contained in the recorded information in accordance with results of the discrimination performed by the time period discriminating means; wherein:

the imaging parameter detection means detects a lens position of the imaging optical system as the at least one imaging parameter;

the time period discriminating means receives the lens position from the recorded information read out by the medium playback means, and discriminates periods of infinite distance in which the lens position is at an infinite distance end; and the playback display means plays back and displays the moving-picture image information contained in the recorded information only during the periods of the infinite distance discriminated by the time period discriminating means or during time periods other than the periods of the infinite distance.

4. An electronic camera operating method comprising:

producing moving-picture image information by imaging an object via an imaging optical system;

detecting at least one imaging parameter of the imaging optical system;

receiving the moving-picture image information produced by the imaging and the at least one imaging parameter, and recording the moving-picture image information and the at least one imaging parameter on a recording medium as recorded information;

reading out the recorded information from the recording medium;

receiving the at least one imaging parameter from the recorded information read out, and discriminating time periods during which the received at least one imaging parameter agrees with at least one pre-set condition; and playing back and displaying the moving-picture image information contained in the recorded information in accordance with results of a time period discriminating;

wherein:

the at least one imaging parameter detecting detects focal point adjustment conditions of the imaging optical system as the at least one imaging parameter;

the time periods discriminating discriminates out-of-focus periods in which the focal point adjustment conditions represent an out-of-focus state; and the playing back and displaying plays back and displays the moving-picture image information contained in the recorded information only during time periods other than discriminated out-of-focus periods.

5. An electronic camera operating method comprising:

producing moving-picture image information by imaging an object via an imaging optical system;

detecting at least one imaging parameter of the imaging optical system;

receiving the moving-picture image information produced by the imaging and the at least one imaging parameter, and recording the moving-picture image information and the at least one imaging parameter on a recording medium as recorded information;

reading out the recorded information from the recording medium;

receiving the at least one imaging parameter from the recorded information read out, and discriminating time periods during which the received at least one imaging parameter agrees with at least one pre-set condition; and playing back and displaying the moving-picture image information contained in the recorded information in accordance with results of the time period discriminating;

wherein:

the at least one imaging parameter detecting detects a lens position of the imaging optical system as the at least one imaging parameter; the time period discriminating discriminates point-blank periods in which the lens position is at a point-blank end; and the playing back and displaying plays back and displays the moving-picture image information contained in the recorded information only during time periods other than the discriminated point-blank periods.

6. An electronic camera operating method comprising:

producing moving-picture image information by imaging an object via an imaging optical system;

detecting at least one imaging parameter of the imaging optical system;

receiving the moving-picture image information produced by the imaging and the at least one imaging parameter, and recording the moving-picture image information and the at least one imaging parameter on a recording medium as recorded information;

reading out the recorded information from the recording medium;

receiving the at least one imaging parameter from the recorded information read out, and discriminating time periods during which the received at least one imaging parameter agrees with at least one pre-set condition; and playing back and displaying the moving-picture image information contained in the recorded information in accordance with results of a time period discriminating;

wherein:

the at least one imaging parameter detecting detects a lens position of the imaging optical system as the at least one imaging parameter;

the time periods discriminating discriminates periods of infinite distance in which the lens position is at an infinite distance end; and the playing back and displaying plays back and displays the moving-picture image information contained in the recorded information only during discriminated periods of the infinite distance or during time periods other than discriminated periods of the infinite distance.

* * * * *